(12) United States Patent
Mizutani et al.

(10) Patent No.: US 8,428,457 B2
(45) Date of Patent: Apr. 23, 2013

(54) OPTICAL PASSIVE NETWORK SYSTEM AND ITS OPERATION METHOD

(75) Inventors: Masahiko Mizutani, Fujisawa (JP); Yusuke Yajima, Fujisawa (JP); Akihiko Tsuchiya, Yokohama (JP)

(73) Assignee: Hitachi, Ltd., Tokyo (JP)

(*) Notice: Subject to any disclaimer, the term of this patent is extended or adjusted under 35 U.S.C. 154(b) by 297 days.

(21) Appl. No.: 12/767,750

(22) Filed: Apr. 26, 2010

(65) Prior Publication Data

US 2010/0272436 A1    Oct. 28, 2010

(30) Foreign Application Priority Data

Apr. 27, 2009 (JP) .................... 2009-107282

(51) Int. Cl.
*H04J 14/00* (2006.01)
*H04B 10/06* (2006.01)
*H04B 10/20* (2006.01)

(52) U.S. Cl.
USPC ...... 398/25; 398/43; 398/66; 398/9; 370/314; 370/345

(58) Field of Classification Search ................ 398/9, 25
See application file for complete search history.

(56) References Cited

U.S. PATENT DOCUMENTS

| | | | | |
|---|---|---|---|---|
| 5,761,197 A | * | 6/1998 | Takefman | 370/337 |
| 5,912,998 A | * | 6/1999 | Quayle | 385/24 |
| 2003/0067875 A1 | * | 4/2003 | Yoshida et al. | 370/232 |
| 2005/0131940 A1 | * | 6/2005 | Le Sauze et al. | 707/104.1 |

FOREIGN PATENT DOCUMENTS

| | | |
|---|---|---|
| JP | 2001-119731 A | 4/2001 |
| JP | 2008-017264 | 1/2008 |
| JP | 2009-021874 | 1/2009 |

OTHER PUBLICATIONS

ITU-T G. 984.6 (Mar. 2008), pp. 1-32.
ITU-T G.984.3 (Mar. 2008), pp. 1-135.
Japan Patent Office Notification of Reasons for Refusal on application JP 2009-0107282 drafted Oct. 23, 2012; pp. 1-2.

* cited by examiner

*Primary Examiner* — Shi K Li
*Assistant Examiner* — Oommen Jacob
(74) *Attorney, Agent, or Firm* — Foley & Lardner LLP

(57) ABSTRACT

In the configuration of an optical communication system interconnecting a parent station and a plurality of child stations via an optical fiber network equipped with an optical splitter, RE is provided having a measuring unit for measuring a transmission distance or time to a child station, a determining unit for determining a timing when a child station transmits a signal, in accordance with a transmission bandwidth request from the child station, and a signal processing unit for processing a signal received from a child station and transmitting the processed signal to the parent station. When a burst signal is received from each child station at the determined timing, a portion of the header of the burst signal is deleted, and a dummy signal is inserted into the deleted area and a gap area between received burst signals to convert the burst signals into a series of signals to be sent to the parent station.

9 Claims, 13 Drawing Sheets

| Alloc-ID# | REQUEST AMOUNT | FLAG |
|---|---|---|
| AL-1 | BW-1 | 1 |
| AL-2 | 0 | 0 |
|  |  |  |
| AL-n | BW-n | 0 |

| Alloc-ID# | Start | TRANSMISSION AMOUNT | Valid | OTHER FLAGS |
|---|---|---|---|---|
| AL-1 | 0 | 100 | 1 |  |
| AL-2 | 1.50 | 50 | 1 |  |
|  |  |  |  |  |
| AL-n |  |  |  |  |

OPTICAL PASSIVE NETWORK SYSTEM AND ITS OPERATION METHOD

BACKGROUND OF THE INVENTION

The present invention relates to the configuration of an optical passive network system in which a plurality of subscriber apparatus share an optical transmission line, and to an operation method for the system, and more particularly to a system configuration and operation method suitable for system extension such as elongation of a transmission distance and an increase in the number of subscriber apparatus.

Because the demand for communications using broadband is so high, access lines of users are changing to large capacity access lines using an optical fiber instead of using techniques of telephone lines such as Digital Subscriber Lines (DSLs). From the viewpoint of line laying and maintenance management cost, widely used as an access network system is a Passive Optical Network (PON) system (hereinafter called simply PON, or an optical passive network system or a passive optical network system where appropriate). PON is a system in which an optical signal is transmitted and received between a station side apparatus and a plurality of subscriber apparatus, through branches and multiplex using optical fibers and optical splitters. The station side apparatus is hereinafter called an optical line termination (OLT) or a parent station. The subscriber apparatus is hereinafter called an optical network unit (ONU) or a child station. Standardization (recommendations) of the PON system is being made by various standardization facilities, e.g., International Telecommunication Union (hereinafter called ITU-T (International Telecommunication Union-Telecommunication Standardization Sector), and introduction to each country is prevailing. For example, introduction of Gigabit capable PON (GPON) stipulated by ITU-T Recommendations G984.3 starts already in each country.

General home subscribers hereinafter called users in some cases) increase the chances of communications for information collection and social life by accessing the Internet or the like, and an increase in the number of access networks is requested for making users connect a communication network. In order to increase the number of users, it is considered to additionally introduce PON itself to be used as an access network, i.e., to add an OLT, or to increase the number of ONUs accommodated by OLT of PON. PON is generally configured in such a manner that OLT performs all works including complicated system control such as bandwidth control and management of accommodated ONUs. OLT is therefore far more expensive than ONU. A cost incurred for newly laying optical fibers is a large expense for the carrier. A desired solution method is therefore to increase the number of accommodated ONUs per OLT, rather than to additionally install an OLT. An already existing PON has a limit in its performance such as an attenuation amount of an optical signal propagating in an optical fiber to be caused by a transmission performance of the optical fiber and the number of branches of an optical splitter. Many of GPONs have settings of a maximum communication distance of 20 km and a maximum number of 64 of branches of the optical splitter (the number of ONUs connectable to OLT). In this connection, studies have started on a relay (hereinafter called Reach Extender (RE)) aiming at elongating a communication distance of an optical fiber and increasing the number of branches. The basic concept of the studies is to realize elongation of a communication distance of an optical fiber and an increase in the number of branches by properly installing RE in an optical signal communication section between OLT and ONUs and to make OLT control RE. As its control protocol, ITU-T Recommendations G984.6 was stipulated using an ONU Management Control Interface (OMCI): an already existing ONU control protocol. Introduction of RE allows high speed Internet access services to be provided in the district with delayed prevailing of IT technology other than the central urban district. Attention is paid to RE, as one access network prevailing spread method.

A method of introducing RE to PON includes a method of inserting RE into a trunk fiber (also called line concentrator optical fiber) used commonly by each ONU between OLT and an optical splitter, and a method of inserting RE into a branch line optical fiber used between an optical splitter and each ONU.

As RE is inserted into a line concentrator optical fiber, a communication distance is elongated more than a conventional PON. Subscriber ONUs existing in a remote district can therefore be accommodated in the same OLT so that it becomes easy to increase the number of accommodated ONUs. Namely, an ONU accommodation efficiency of OLT is improved.

On the other hand, as the communication distance is elongated, a communication time (transmission delay time) to ONU in a remote district prolongs and the number of remote ONUs increases, resulting in prolongation of a signal wait time at ONU and an increase in a signal processing load on OLT. There is therefore a possibility that a communication time assigned to each ONU is shortened. More specifically, in order for OLT to receive a signal from an arbitrary ONU through time division multiplexing, OLT executes a process (hereinafter called Dynamic Bandwidth Assignment (DBA)) of dynamically assigning a communication bandwidth by considering a transmission bandwidth request received from ONU. In this case, since RE is inserted, an expected wait time at each ONU continues to prolong until a transmission permission is acquired after a transmission request is sent. A communication interception (standby) time prolongs at each ONU. Namely, since the communication interception (standby) time prolongs at each ONU in operation, the signal quality requiring real time performance is adversely affected, and the communication capacity (bandwidth) assignment process by DBA for all ONUs becomes complicated, or an assigned capacity is reduced.

It is therefore desired to provide PUN capable of suppressing the above-described issues including an increase in a signal processing load on OLT, prolongation of a signal transmission wait time/reduction in a transmission signal bandwidth at each ONU, and deterioration of a transmission signal quality, PON being desired to provide a communication quality of the same degree as that of a conventional PON, even if RE is introduced to PON and a communication distance between OLT and ONU is prolonged and the number of accommodated ONUs is increased. More specifically, it is an object of the present invention to provide a PON and a PON control method capable of suppressing the above-described issues even if DBA necessary for PON is executed.

Even with the method of inserting RE into a branch optical fiber, ONU performing communications via RE is also associated with the same issues described above. It is characteristic, however, in that other ONUs are not influenced by REs so that a conventional PON control method (DBA) can be used for the other ONUs. It is therefore an another object of the present invention is to provide a PON and a PON control method, PON having ONUs connected via REs and ONUs without REs in a mixed manner and configured in such a manner that a conventional PON control method and a control method incorporating REs are selectively used in accordance with a layout of REs.

SUMMARY OF THE INVENTION

According to settle the above-described issues, in the configuration of PON of the present invention, when an up signal transmitted from ONU is to be transferred from a relay apparatus to OLT, a burst signal form is changed to a continuous signal form for transmission. More specifically, an optical communication system connecting a parent station and a plurality of child stations via an optical network equipped with an optical splitter is provided with a relay for relaying a signal for transmission/reception between the parent station and a plurality of child stations, and the relay is provided with a control unit for assigning a child station with a bandwidth for transmission of an up signal. In response to a request from each of the plurality of child stations, timings for transmitting a signal from each of the plurality of child stations to the parent station are determined and burst signals from the plurality of child stations are multiplexed on the optical fiber network, and this multiplexed signal is converted into a continuous optical signal by the relay to be transferred to the parent station.

In detail, when the relay receives a signal from a child station, a guard time bit portion and a portion of the received burst signal contained before and after each burst signal are deleted, and this deleted area is stuffed with a dummy signal or a received signal from another child station and subjected to a change in a timing to convert a plurality of signals from each of child stations into a series of signals to be transmitted to the parent station. The parent station can thus receive a continuous signal having a constant optical intensity without intercepting the frame.

Namely, an optical communication system connecting a parent station and a plurality of child stations via an optical network equipped with an optical splitter includes a relay for relaying a signal for transmission/reception of a signal between the parent station and the plurality of child stations in the optical fiber network, the relay having a control unit including: a measuring unit for measuring a transmission distance or time to each child station; a determining unit for determining a timing when the child station transmits a signal, in response to a transmission bandwidth request from the child station; and a signal processing unit for processing a signal received from the child station and transmitting the processed signal to the parent station, wherein: the relay notifies each child station of the timing determined by the determining unit after measurement by the measuring unit; upon reception of a burst signal constituted of a header and a payload from the child station at the notified timing, the signal processing unit deletes a portion of the header of the received burst signal in accordance with the timing, and converts the received burst signals into a series of signals by inserting a dummy signal into the deleted area and a gap area between received burst signals to be transmitted to the parent station, and the parent station receives the series of signals converted the relay from signals from the plurality of child stations.

The configuration may be such that the timing determining unit divides a plurality of child stations into a plurality of groups, in response to a transmission bandwidth request from the child station, the timing for transmitting a signal is determined for each of the groups, upon reception of a burst signal constituted of a header and a payload from the child station at the timing, the signal processing unit deletes a portion of the header of the received burst signal in accordance with the timing, and converts the received burst signals into a series of signals by inserting a signal received from an arbitrary child station of each group and subjected to a change in a timing into the deleted area and a gap area between received burst signals to be transmitted to the parent station.

The series of signals to be transmitted from the relay to the parent station is a continuous optical signal having a constant intensity between the relay and the parent station, irrespective of an optical intensity of the frame signal transmitted from each of the plurality of child stations.

Since burst signals from the child stations are converted into a continuous optical signal to be transmitted to the parent station, burst signals from the child stations having different optical intensities are converted into a continuous optical signal having a constant intensity to reach the parent station. An up signal receiver of the parent station can therefore be made of components of simple structures, resulting in simplification and low cost.

Even in the case wherein a relay is introduced into an optical communication system (PON) to prolong a communication distance between the parent station and child station and to increase the number of accommodated child stations, the relay reproduces the up signals to form a continuous signal. It is therefore possible to reduce the bandwidth to be assigned to a guard band between frames and to improve a bandwidth use efficiency of the line concentrator optical fiber interconnecting the relay and the parent station. It is therefore possible to suppress a reduction in an up bandwidth assignment amount to each child station.

Since an up optical signal is terminated at the relay, it is possible to share the physical signal processing considering the optical characteristics to the relay and to share the logical signal processing such as bandwidth assignment to the parent station. It is therefore possible to prevent occurrence of events such as an increase in a signal transmission wait time at each child station (i.e., an increase in the cost of a component such as a memory buffer), and a reduction in a transmission signal bandwidth per child station. Quality deterioration of an optical signal transmitted from each child station and received at the parent station can be suppressed.

BRIEF DESCRIPTION OF THE DRAWINGS

FIG. 8 is a diagram illustrating an example of the structure of a memory constituting a bandwidth request information database equipped in RE.

FIG. 9 is a diagram illustrating an example of the structure of a memory constituting a DBA information database equipped in RE.

DESCRIPTION OF THE EMBODIMENT

Description will now be made on the configuration and operation of a PON system the present invention with reference to the accompanying drawings, by using as an example the configuration and operation of GPON stipulated by ITU-T Recommendations G984.3.

Figure 1:
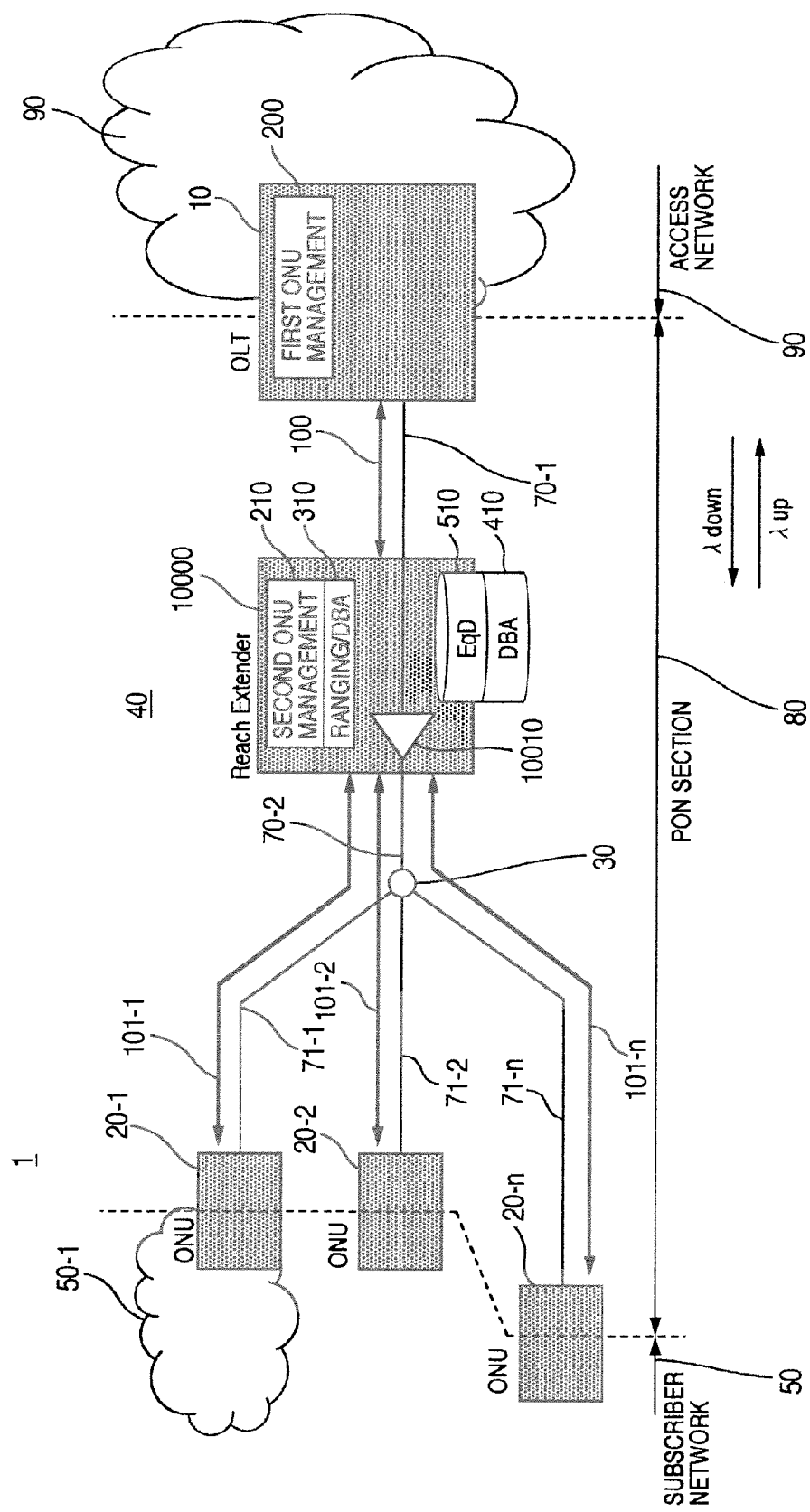
FIG. 1 is a diagram illustrating an example of the configuration of an optical access network using PON of the present invention.

FIG. 1 is a diagram illustrating an example of the configuration of an optical access network using PON of the present invention wherein RE is inserted into a line concentrator optical fiber of PON.

PON 40 is constituted of a station side apparatus (OLT) 10, a plurality of subscriber apparatus (ONUs) 20-1 to 20-n, an optical splitter 30, a line concentrator optical fiber 70, a plurality of branch line optical fibers 71-1 to 71-n, and a signal relay apparatus (RE) 10000 inserted between intermediate lines 70-1 and 70-2 of the line concentrator optical fiber 70. An optical access network 1 of PON connects each of ONUs 20 (20-1 to 20-n) to a subscriber network (or terminals such as PCs and telephones, only a subscriber network 50-1 being illustrated as a representative example) 50, and connects OLT 10 to an access network 90 which is an upper level communication network. In the following, a section between OLT 10 connected the access network and ONU 20 connected the subscriber network 50 is called a PON section. OLT 10 is a communication apparatus having interfaces with both the PON section 80 and access network 90 to perform transmission/reception of information relative to an upper level communication network via the access network 90 and to transfer the information to each ONU 20. Although a packet communication network constituted of IP routers and Ethernet switches (although Ethernet is a registered trademark, this representation is omitted in the following) is often used as the access network 90, other networks may also be used. ONU 20 is installed at a user home or an enterprise site, and is generally connected to a LAN or a corresponding subscriber network 50. Each subscriber network 50 connects an information terminal such as an IP phone, a phone terminal providing already existing phone services and a PC/mobile terminal. Communications between OLT 10 and each of ONUS 20-1 to 20-n are realized by an optical signal propagating through the PON section 80. An optical λ up signal and an optical λ down signal used in PON have different wavelengths to prevent interference of the signals at the optical fibers 70 and 71 and splitter 30.

A down signal transmitted from OLT 10 passes through RE 10000, branches at splitter 30, and reaches all ONUs 20-1 to 20-n. In the case of GPON, the down signal is sent from OLT 10 by using a frame used for propagation in the PON section (this frame is called hereinafter a GPON Encapsulation Method (GEM) frame). The GEM frame is constituted of a header and a payload, and an identifier (Port-ID) of ONU 20 as a destination of the GEM frame inserted in the header. Each of ONUs 20-1 to 20-n extracts the header of the GEM frame, and processes the frame if the destination Port-ID of the frame indicates own ONU or discards the frame if the frame destination is another ONU 20.

Optical λ up signals having the same wavelength are used for up communications from ONUs 20-1 to 20-n. Similar to the down signal, the up signal is a variable length frame of each ONU (hereinafter also called a GEM frame) constituted of a header and a payload. Each ONU 20 sends the up signal by shifting a transmission timing to allow OLT 10 to distinguish the GEM frame transmitted from each ONU 20 and to avoid collision/interference of each up signal at the line concentrator optical fiber 70. These up signals reach OLT 10 after time division multiplexing on the line concentrator optical fiber 70. More specifically, (1) a signal delay amount is adjusted in accordance with a ranging measurement result of a distance from RE 10000 to each of ONUs 20-1 to 20-n, and (2) With DBA, RE 10000 makes each of ONUs 20-1 to 20-n declare an amount of data waiting for transmission to RE, and instructs an up signal transmission timing and a transmissive data amount of each of ONUs 20-1 to 20-n. (3) Each ONU 20 transmits data at a timing instructed by RE 10000, and these signals reach 10000 after time division multiplexing on the line concentrator optical fiber 70-2. (4) Since RE 10000 knows the timing instructed for each ONU 20, RE 10000 distinguishes a signal of each ONU 20 from the multiplexed signal, and executes a reception process.

RE 10000 has an optical relay function 10010 for relaying an optical signal to be transmitted from OLT 10 to ONU 20 and an optical signal to be transmitted from ONU 20 to OLT 10. The optical relay function 10010 includes generally a mechanism for directly amplifying and transmitting a signal received by an optical amplifier and a mechanism for converting a received optical signal once into an electric signal, confirming the signal contents, executing a necessary process including termination and frame insertion, and thereafter converting again into an optical signal to send the optical signal. These mechanisms are selectively used in accordance with the nature of a signal to be received/transmitted. RE 10000 of PON 40 of the present invention to be described hereinafter has a second ONU management unit 210 and a ranging/DBA unit 310, and executes a signal process (control process) to be executed by ranging and DBA provided in a conventional OLT. A received optical signal (control signal) is therefore converted once into an electric signal to process (relay) the signal.

RE 10000 of PON 40 of the present invention executes a portion or the whole of ranging and DBA conventionally executed by OLT 10. The reason for this is to prevent a prolongation of a process time for a control signal in the PON section 80 elongated by RE 10000 as described previously. More specifically, as illustrated in FIG. 1, PON 40 of the present invention performs ranging of sections 101-1 to 101-n between RE 10000 and each ONU 20. A ranging result is stored in a ranging database 510 provided in RE 10000, and used for DBA to follow as well as for the operation of PON 40.

As a newly connected ONU is detected, RE 10000 executes ranging process to measure a round trip delay (RTD) between RE 10000 and each of ONUs 20-1 to 20-n, RE 10000 calculates from RTD an equivalent delay (EqD) to be set to each of ONUs 20-1 to 20-n, and stores EqD in an EqD information database 510. EqD is set by an EqD setting unit of an already existing PUN in such a manner that response times from each ONU to RE 10000 all become the same in the system. For ranging to be performed by RE 10000, a ranging method stipulated by ITU-T Recommendations G984.3 may be used. Namely, RE 10000 operates as a proxy of OLT 10. Assuming that ranging is performed from RE 10000 to each ONU 20, a total length of the line concentrator optical fiber 70-2 and each branch line optical fiber 70-1 is set shorter than 20 km and a distance of the PON section 80 is set 20 km or longer by elongating the line concentrator optical fiber 70-1 through introduction of RE 10000. Even with this configuration, only RE 10000 performs the same ranging as that of a conventional PON during the operation of PON 40, although this configuration depends on an installation position of 10000. As described previously, it becomes possible to prevent an increase in a process load of the management of all ONUs by OLT to be caused by the elongated PON section 80.

The EqD information DB 510 of RE 10000 stores EqD information and RTD of the optical communication section 101, so that after RE 10000 performs bandwidth assignment of each ONU 20, the signal from each ONU is received correctly.

Figure 2:
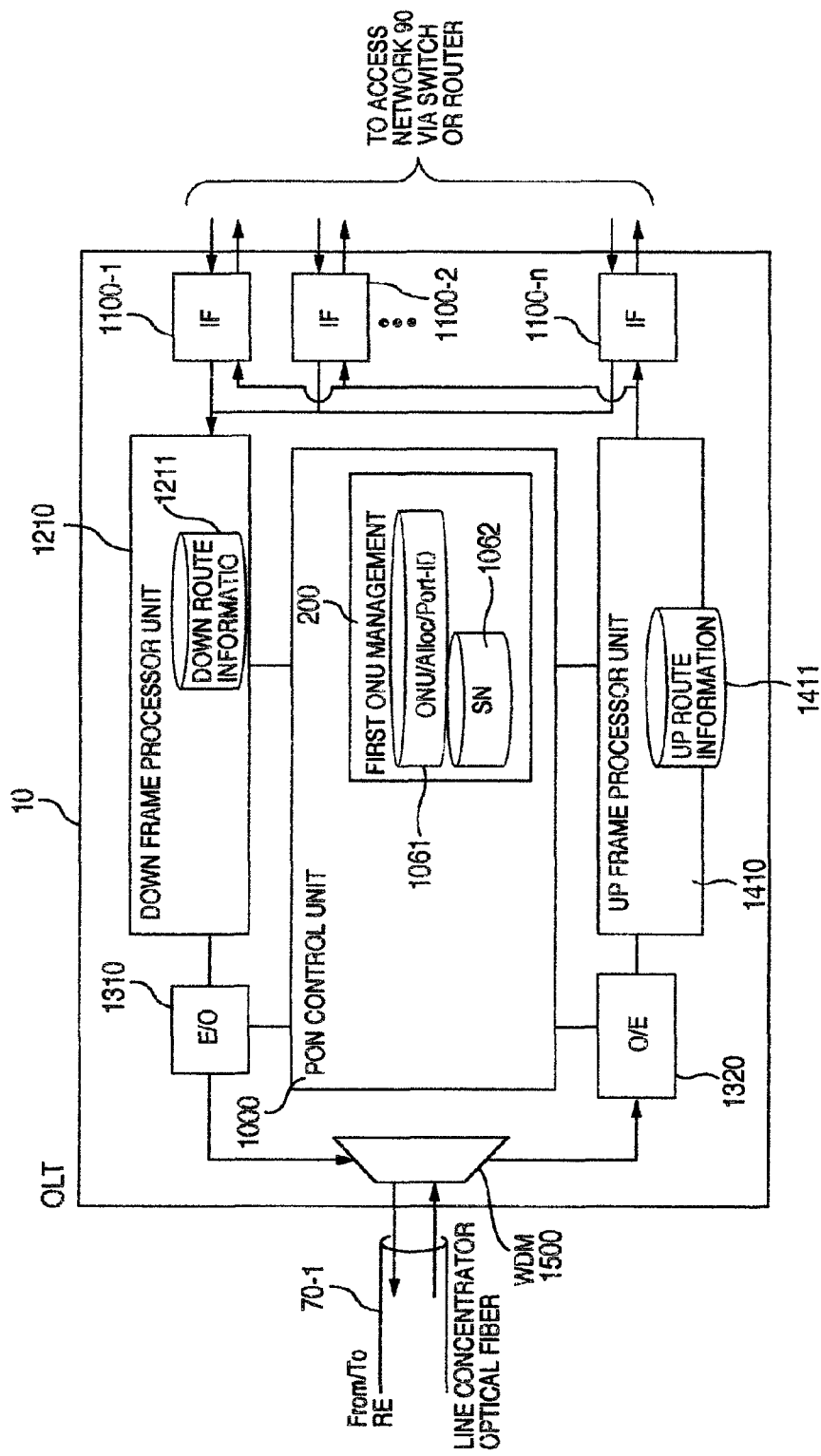
FIG. 2 is a block diagram illustrating an example of an OLT of PON.

FIG. 2 is a block diagram illustrating an example of the structure of OLT of PON.

A down signal is input from the access network 90 to one of IFs 1100-1 to 1100-*n* which are Service Network Interfaces (SNIs). Although a packet network is often used as the access network 90 and an Ethernet interface of 10/100 Mbps or 1 Gbps is often used as IF, the present invention is not limited thereto. A received signal (this signal is called hereinafter also data or packet) is transferred to a down frame processor unit 1210 whereat header information of the packet is analyzed. More specifically, ONU 20 to which the received packet is transferred is determined in accordance with flow identification information including destination information, transmission source information and route information included in the packet header. Conversion and addition of header information of the received packet are performed if necessary, at the same time when the destination information is supplied. In this configuration, the down frame processor unit 1210 has a down route information DB 1211 to be used for determining a process including destination determination, and conversion and addition of header information. This process is executed by referring to DB 1211 by using as a trigger one or more parameters contained in the header information of a received packet.

The down frame processor unit 1210 is also provided with a frame forming function of changing the received packet to have a frame format for transmission in the PON section, in accordance with header processing contents determined by the down frame processor unit 1210. A specific process of transmitting a received Ethernet packet to the PON section 80 of GPON is as follows. (1) Header information of the Ethernet packet is extracted, and (2) the down route information DE 1211 of the down frame processor unit 1210 is searched by using the header information as a trigger to execute a Virtual LAN (VLAN) tag process (conversion, deletion, transmission, addition) for the received packet and to determine a transfer destination (3) The frame forming function generates a GEM header including Port-ID and set to the corresponding transfer destination ONU, and (4) the GEM header is added to the received packet to capsule the Ethernet packet as a GEM frame.

The GEM frame capsuled the Ethernet packet is read from the down frame processor unit 1210, and an E/O conversion unit 1310 converts an electric signal into an optical signal which is transmitted to ONU 20 via a wavelength division multiplexing (WDM) unit 1500 and the line concentrator optical fiber 70-1.

Each ONU 20 transmits an up signal to theft) section 80 at a timing designated by RE 10000. This up signal is a burst signal intermittently transmitted from each ONU 20, and received by RE 10000 after time division multiplexing on the line concentrator optical fiber 70-2. The detailed structure and operation of RE 10000 will be later described. These burst signals are converted into a continuous optical signal which is transmitted to OLT 10 via the line concentrator optical fiber 70-1. OLT 10 executes a process of bit synchronization and frame synchronization (frame termination of the PON section 80) in accordance with a preamble added to the start of the continuous optical signal received via the line concentrator optical fiber 70-1 and WDM 1500 and in accordance with a pattern called a delimiter. The present invention is characterized in that a burst up signal from each ONU 20 is changed to a continuous optical signal to be received by OLT 10. Since OLT 10 receives an optical signal converted by RE 10000 into a continuous optical signal having a constant intensity, an up optical signal receiver can be made of simple components as compared to a conventional PON. More specifically, since a received optical level is constant, it is not necessary to use burst signal compatible circuits such as an Automatic Threshold Control (ATC) circuit for changing an optical level at high speed when a signal is received, and a received optical signal level setting circuit operating in cooperation with ATC. An O/E conversion unit 1320 converts an optical signal into an electric signal. According to the present invention, the structure of the O/E conversion unit 1320 of OLT 10 can be simplified and made at a low cost. The details of a frame structure of a continuous optical signal to be received by OLT 10 will be later described.

The up signal terminated at the O/E conversion unit 1320 is transferred to an up frame processor unit 1410, and processed by a sequence approximately opposite to the above-described sequence of the down signal. More specifically, the GEM frame is terminated at the up frame processor unit 1410 to be changed to an Ethernet packet. The up frame processor unit 1410 has an up route information DB 1411, and similar to the down signal, DB is referred to to perform analysis and conversion of header information and to determine a packet transfer destination. Similar to the down frame processor unit 1210, the up frame processor unit 1410 has a frame forming function of changing a received packet to a packet having a frame format for reception/transmission relative to the upper level access network 90. For example, this function converts a GEM frame propagating in the PON section 80 into an Ethernet packet. The Ethernet packet is read from the up frame processor unit 1410 and transmitted to the access network 90 having L2 switches and IF 1100-1 to 1100-*n*.

A PON control unit 1000 controls the whole of PON 40 including RE 10000, and performs control such as settings and management of each ONU 20. In the configuration of this embodiment, since RE 10000 performs ranging and DBA, OLT 10 includes a first ONU management unit 200 for cooperation with RE 10000. When a start position of a received signal (continuous signal) is detected by an up signal synchronizing process, the PON control unit extracts ONU identification information: ONU-ID or Port-ID in the case of GPON, from the header information of a received up frame, to thereby identify a transmission source. The up frame processor unit 1410 is provided with information for terminating a GEM frame propagating in the PON section and converting it into a frame having an Ethernet format.

A first ONU management unit 200 has a function of managing and controlling ONUs 20-1 to 20-*n* under OLT 10 in accordance with a reception state of each signal from ONU 20 and RE 10000, and header information contained in a received frame. A state of ONU 20 means a management state of whether ONU 20 is connected, whether a state is a setup intermediate state or a running state, and whether a normal communication is possible (whether a fault or an abnormal signal is detected). More specifically, in this embodiment, a serial number (SN) assigned in advance to each ONU is stored in an SN DB 1062, and ONU-ID, Alloc-ID and Port-ID assigned to each ONU 20 by OLT 10 are stored in an ONU/Alloc/Port-ID DB 1061. These parameters are only illustrative, and other parameters necessary for controlling PON may also be stored. DBs may be substituted for one DB or may include three or more DBs.

Figure 3:
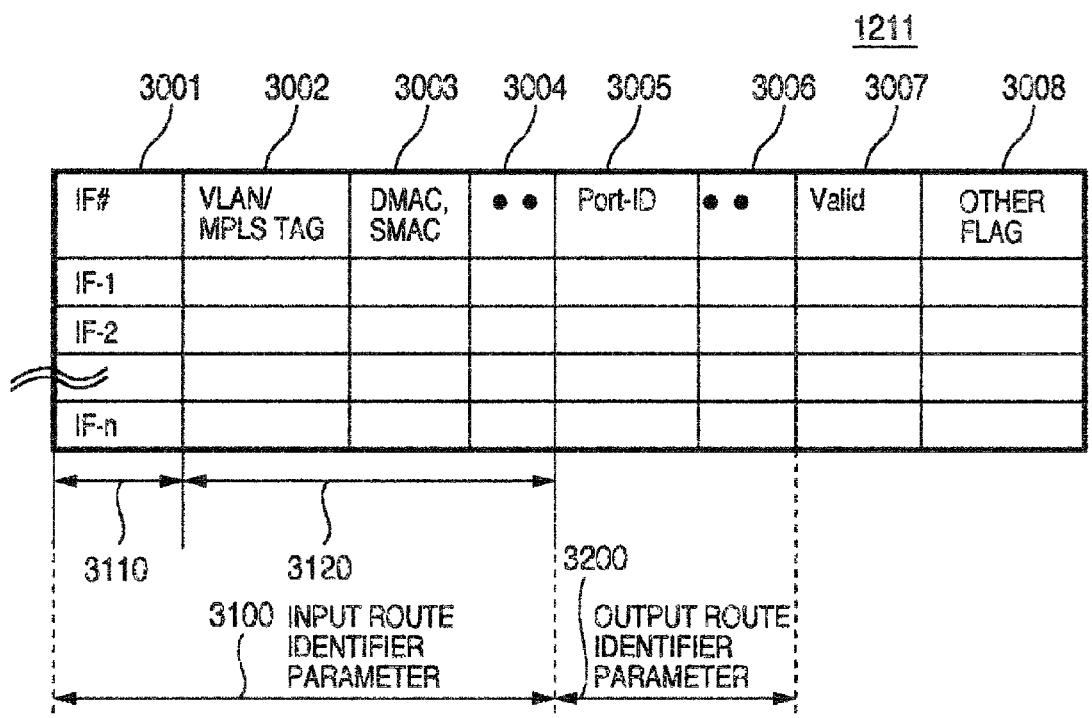
FIG. 3 is a diagram illustrating an example of the structure of a memory constituting a down route information database of OLT.

FIG. 3 is a diagram illustrating an example of the structure of the OLT down route information DB.

This DB stores as a received frame identifier (transfer destination search keys: input route identifier parameters 3100) including a down frame received interface identifier 3001, route information 3002 such as a VLAN tag and/or an MPLS label widely used as a route identifier, a destination and/or transmission source MAC address 3003 contained in an Ethernet frame header and other input header information 3004. The other input header information 3004 includes VLAN tag information of multi-stage VLAN tags and Type field information of an Ethernet frame. Destination information (output route identifier parameters 3200) includes Port-IDs 3005 which are identification information of down stream transmission destinations ONU 20-1 to 20-n. The structure of this DE includes a valid field 3007 indicating validity of each table entry and another flag field 3008. Examples of the other flags may be a flag representative of a control priority order to be set for header information of a received frame, time information indicating a process time until a frame corresponding to each entry is transmitted, a use as a counter for counting the number of frames corresponding to each entry, and a use as a timer indicating an expiration date of the entry. The fundamental configuration of the up route information DB is approximately similar to that of DB 1211. Different points reside in that Port-ID 3005 is used as a search key, and for example VLAN information 3002 is used as the output header information. Namely in FIG. 3, a search key 3100 and output parameter information 3200 are interchanged.

Figure 4:
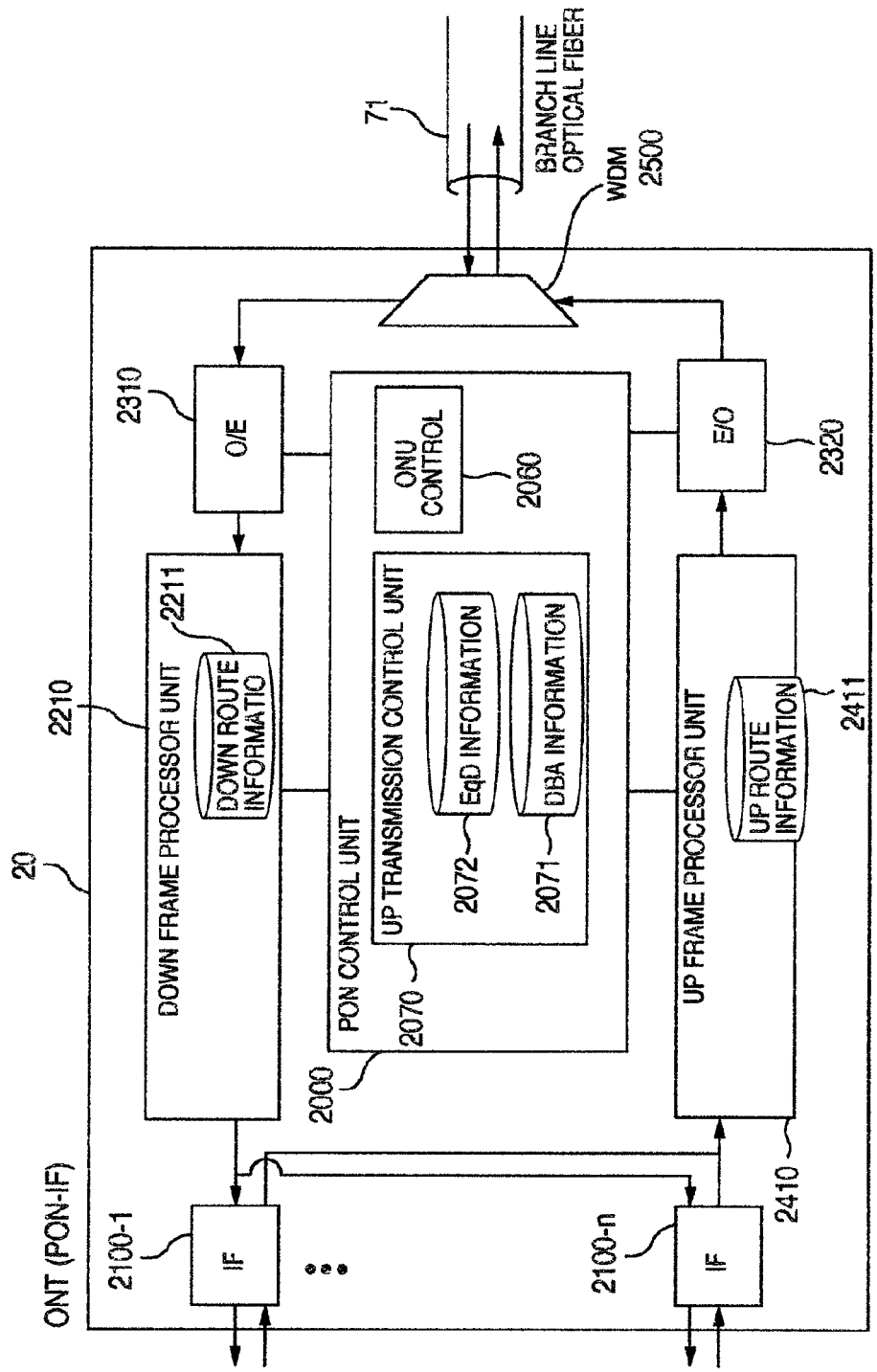
FIG. 4 is a block diagram illustrating an example of the structure of an ONU of PON.

FIG. 4 is a block diagram illustrating an example of the structure of ONU of PON.

An up signal from a terminal (not shown) accommodated in ONU 20 to PON is input from the subscriber network 50 to each of IFs 2100-1 to 2100-n which are User Network Interfaces UNIs). Although a LAN or a packet network is often used as the subscriber network 50 and an Ethernet interface of 10/100 Mbps or 1 Gbps is often used as IF, the present invention is not limited thereto.

The structure and operation of ONU 20 for processing down and up signals are approximately similar to the structure and operation of OLT 10 described with reference to FIG. 2. Namely, the down signal, a down frame processor unit 2210 provided with a down route information DB 2211 converts a GEM frame received from the PON section 80 into an Ethernet packet which is output to a terminal of ONU 20. For the up signal, an up frame processor unit 2410 provided with an up route information DB 2411 converts an Ethernet packet received from a terminal into a GEM frame which is output to OLT 10. The structure of a PON control unit 2000 includes an up transmission control unit 2070 and an ONU control unit 2060.

The up transmission control unit 2070 has an EqD information DB 2072 for storing an EqD value notified from RE 10000 as a result of ranging and a DBA information DB 2071 for storing a result (signal transmission start position/time-timing, a transmission amount, etc.) of DBA performed by RE 10000. The up frame processor unit 2410 refers to the values stored in these DBs, as reference information when information is sent at a correct timing (timing of time division multiplexing so as to prevent superposition of a signal from another ONU 20 at RE 10000) in accordance with an up communication transmission instruction sent from OLT 10 or RE 10000. The frame processor unit 2410 transmits the up signal to OLT 10.

The ONU control unit 2060 is a functional block to be used for parameter settings for setting up ONU 20 and communication state management, in accordance with an instruction from OLT 10 or RE 10000. For examples, the processes of this block include analysis of a received frame, management of maintenance management information of the apparatus, judgment of whether communication (return response) to OLT 10 or RE 10000 is necessary, and the like.

Figure 5:
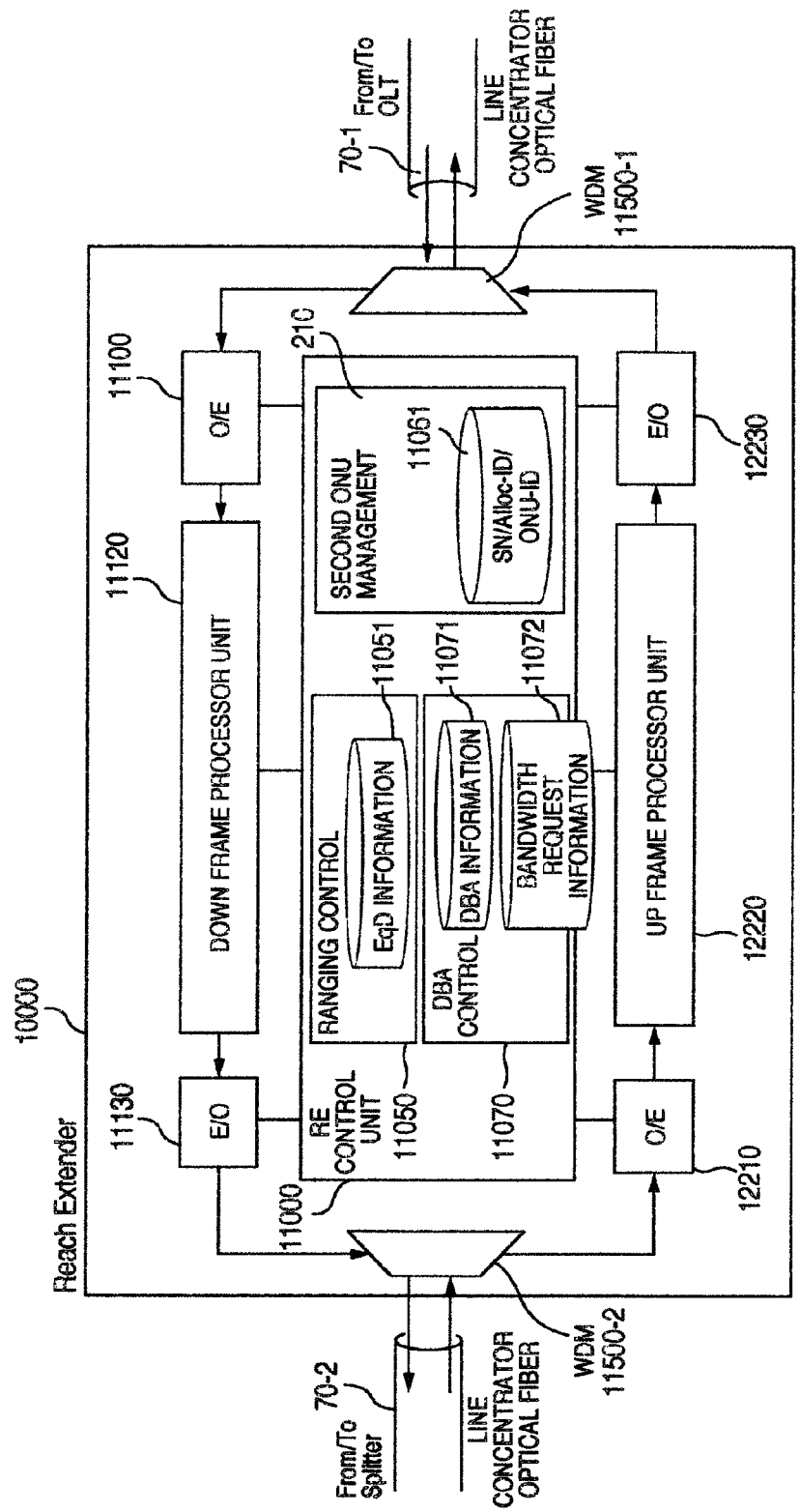
FIG. 5 is a block diagram illustrating an example of the structure of an RE equipped in PON of the present invention.

FIG. 5 is a block diagram illustrating an example of the structure of PON of the present invention.

RE 10000 is used fundamentally by being inserted in the line concentrator optical fiber 70 of the PON section 80. More specifically, in this configuration, OLT 10 and RE 10000 are connected by the line concentrator optical fiber 70-1, and RE 10000 and the splitter 30 are connected by the line concentrator optical fiber 70-2. RE 10000 is used to maintain the performance of PON even if ONUs 20 in a district remote from OLT 10 are accommodated by elongating the line concentrator optical fiber 70-1.

RE 10000 has an O/E conversion unit 11110 for down signal reception, an E/O conversion unit 11130 for down signal transmission, an O/E conversion unit 12210 for up signal reception and an E/O conversion unit 12230 for up signal transmission. When a down signal and an up signal are received via a WDM 11500-1 and a WDM 11500-2, respectively, the signals are terminated through frame synchronization, similar to OLT 10 and ONU 20. Since a received optical signal is converted once into an electric signal, it becomes possible to execute a header process for a received frame and to confirm frame information, at the down frame processor unit 11120 and up frame processor unit 12220 and at an RE control unit 11000. Similar to OLT 10 and ONU 20, in this configuration, information generated in the RE control unit 11000 can be sent as a frame to OT 10 and ONU 20 via the down frame processor unit 11120 or up frame processor unit 12220. An example of information to be sent from RE 10000 is a ranging response request message to be transmitted for ranging a newly connected ONU 20. An example of information to be terminated at RE 10000 is a response message to be sent from ONU 20 in response to the ranging response request.

The RE control unit 11000 has a ranging control unit 11050, a second ONU management unit 210 and a DBA control nit 11070.

The ranging control unit 11050 performs ranging the sections 101-1 to 101-n between RE 10000 and ONUs 20, and includes an EqD information DB 11051 for storing RTD of each ONU 20 measured by ranging and storing EqD calculated from RTD. The ranging control unit has a function of, if a start position of a signal received at RE 10000 is shifted from an estimated reception position (estimated time) as described previously, notifying a corresponding ONU 20 of a change in EqD setting and at the same time changing the EqD information of the ONU 20. More specifically, the RE control unit 11000 judges whether EqD of ONU 20 is required to be corrected, if it is judged that correction is required, the frame processor unit 11120 generates a corresponding instruction which is transferred to ONU 20 via the E/O conversion unit 11130. The ranging control unit 11050 updates the contents of EqD information of ONU in accordance with the change information. If a shift detected at RE 10000 is a predetermined value or smaller, RE 10000 instructs ONU 20 to correct the EqD information DB, whereas if the shift exceeds the predetermined value, RE 10000 executes again the ranging process of the corresponding ONU 20.

The second ONU management unit 210 has ONU identification information for identifying ONU 20 to be subjected to ranging by the ranging control unit 11050. More specifically, the second ONU management unit has an SN/ONU-ID information DB 11061 for storing correspondence between SN information of each connected ONU 20 and an ONU-ID assigned to ONU 20 by OLT 10. With this DB 11061, it becomes possible to confirm for each Alloc-ID representative of a bandwidth management (management of DBA) whether a signal was transmitted at a time instructed to ONU 20 by RE 10000 (whether a signal was received at an estimated time), and to perform a necessary support if RE 10000 judges that it is necessary to correct EqD or perform again ranging. This DB 11061 may be used for instructing ONU to adjust an optical transmission intensity, if an up signal received at RE 10000 is insufficient (at a level unable to recognize the signal sufficiently) or if an optical level is high by a predetermined value or larger as compared to an expected proper optical intensity.

In the operation of RE 10000, a burst up signal from each ONU 20 received at the line concentrator optical fiber 70-2 is subjected to a constant delay in the apparatus, converted into a continuous optical signal on the line concentrator optical fiber 70-1 to be sent to OLT 10 as an optical signal having a constant intensity. Since a burst process is completed, OLT 10 is unnecessary to deal with each burst signal so that the structure of the optical signal receiver and the optical signal processing can be simplified. The O/E conversion unit 12210 refers to DBA information 11071 stored in the DBA control unit 11070 to acquire a timing when an up signal from each ONU 20 is received, and in accordance with this timing, adjusts ATC and an optical intensity level setting circuit so as to receive each burst signal from each ONU 20 at a proper S/N ratio and a proper optical intensity. Bandwidth request information 11072 accumulates an up bandwidth request contained in an up signal from ONU 20 to hold a request value of the bandwidth request of each ONU until the DBA process and bandwidth assignment are completed. The reason for this is as follows. The DBA process assigns a bandwidth at a constant interval in accordance with a bandwidth request, a priority degree and the like. There is therefore a time lag between a bandwidth request of each ONU 20 and a completion of actual bandwidth assignment, or a sufficient bandwidth cannot be assigned in a DBA period depending upon a requested bandwidth so that assignment in the next DBA period becomes necessary. The request information is therefore required to be stored during a period while the DBA process continues.

A GEM frame received at an O/E, conversion unit 12210 is sent to an up frame processor unit 12220. The up frame processor unit 12220 inserts a dummy signal (or dummy packet) into a burst synchronization signal portion (guard time, preamble, delimiter) area associated with a GEM header of the frame. In this structure, a header position designation provided in dummy data so that OLT 10 can distinguish a header position of the GEM frame following the dummy portion, irrespective of which one of the dummy signal and dummy packet is adopted.

In the structure of the RE control unit 11000, an RE-ID register (not shown) is provided to manage an identifier RE-ID assigned to the RE apparatus itself. This identifier becomes necessary for identifying information to be terminated at RE 10000 itself when OLT 10 transmits a control message for requesting a response from RE 10000. When a signal is transmitted from RE 10000 to OLT 10, this identifier is also used for OLT 10 to identify a transmission source RE of the signal. Port-ID used by ONU of an already existing PON may be used as RE-ID.

Figure 6:
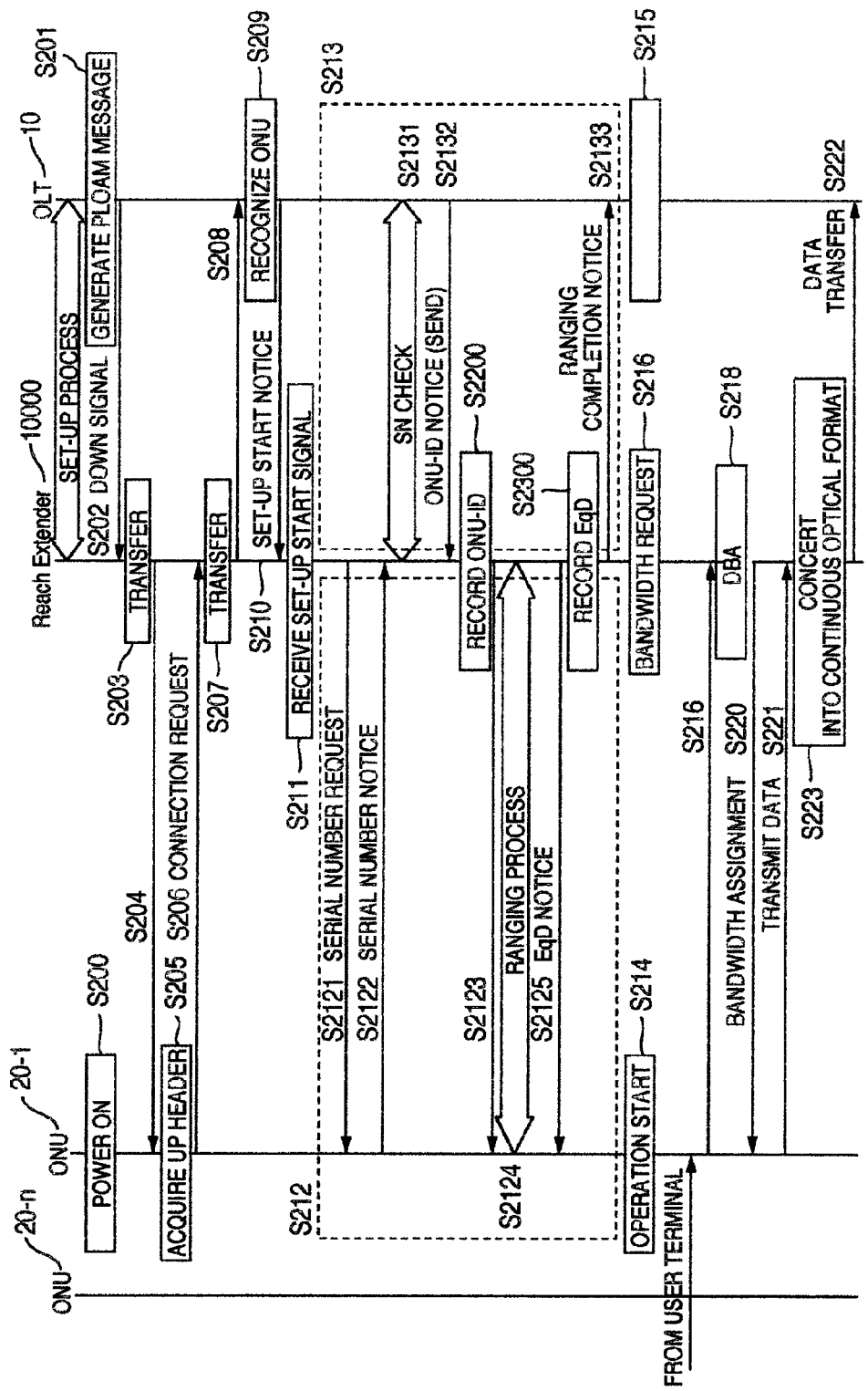
FIG. 6 is a sequence diagram illustrating an example of the operation of PON of the present invention.

FIG. 6 is a sequence diagram illustrating an example of the operation of PON of the present invention. The sequence diagram illustrates an example of a process of making OLT 10 set up ONU 20 via RE 10000 and the following operation in a running state.

As RE 10000 is set up and communications between OLT 10 and RE 10000 become possible, a set-up process of making OLT 10 set up ONU 20 via RE 10000 starts as in the following by using the ONU set-up method stipulated in ITU-T Recommendations G984.3.

In order to detect ONU 20 to be newly connected to OLT 10, OLT 10 generates a PLOAM message at a proper time interval until the number of ONUs 20 reaches the maximum number of accommodated ONUs (S201) and transmits this message to ONU (S202). This down PLOAM message contains header information (specific pattern) to be used when ONU 20 received the PLOAM message sends a message requesting connection to OLT 10 by using an up signal. More specifically, the PLOAM message is transmitted being inserted into the header portion of a GPON down signal. Since the down signal from OLT 10 is a control frame directed to ONU 20, RE 10000 transfers the PLOAM message (S203) to each ONU 20 (S204). More specifically, the PLOAM message is broadcast to all ONUs and received by ONU which requires the message.

As a power source of ONU 20-1 newly connected to OLT 10 is turned on (S200), ONU 20-1 start receiving a down signal S204 transmitted from OLT 10 via RE 10000. After the O/E conversion unit 2310 of ONU 20-1 completes synchronization of an optical signal, the down frame processor unit 2210 detects the frame contents. ONU 20-1 extracts the header information (specific pattern) to be used when a message requesting connection to OLT 10 is sent, from the header information contained in the down signal S204 (S205), and transmits the section request message to OLT 10 (S206). Since the up signal from ONU 20 is a control frame directed to OLT 10, RE 10000 transfers the connection request message (S207) and transmits the message to OLT 10 (S208).

As described above, RE 10000 of the present invention transmits/receives (a portion of) a control signal relative to ONU 20 by using the ONU set-up method stipulated by ITU-T Recommendations G984.3. ONU 20 views a portion of the control as if OLT 10 locates the position of RE 10000 so that the same performance can be maintained by the same control method of an already existing PON. Although description will be made later, there is a message for management control of RE 10000 from OLT 10 or ONU 20, RE 10000 has a function of distinguishing between a signal to be transferred between OLT 10 and ONU 20 and a signal to be processed by RE itself. In this configuration, RE 10000 received these signals returns a response by executing an additional necessary process. This distinction may use a header of a signal transmitted/received in the PON section or a signal called PLOAM (signal insertion area).

If an up signal received at the PON control unit 1000 from a new ONU 20 contains the specific signal pattern indicated in the down PLOAM message, then OLT 10 recognizes that ONU 20 is newly and correctly connected (S209), and starts setting up the corresponding ONU 20-1. More specifically, in order to instruct RE 10000 to start a set-up process of ONU 20-1, a set-up start notice message is transmitted to RE 10000 (S210). This message is generated by the down frame processor unit 1210 in response to an instruction of the PON control unit 1000, and sent to RE 10000. This message may be a Vender Specific OAM message (VSM message) in the PLOAM message stipulated by ITU-T Recommendations G984.3. The message is not limited to the VSM message, but other messages may also be used. In another configuration, a frame to be transmitted to ONU 20 and stipulated by Recommendations may be transmitted even if RE 10000 exists, and 1000 transfers this frame to ONU 20 at the reception process at Step 211.

Upon reception of the set-up start notice S210 (S211), RE 1000 operates as in the following, like OLT 10 stipulated by ITU-T Recommendations G984.3, to start the set-up process of ONU 20-1.

In a first set-up process (S212), a distance to ONU 20-1 is measured by ranging (RTD measurement), and a reference time (logical distance) is adjusted so that a response timing of ONU 20 to RE 10000 becomes coincident with a response time of an already connected ONU. EqD is calculated in accordance with the adjusted response time. As EqD is notified to ONU 20-1, ONU 20-1 outputs thereafter a signal at the timing in conformity with EqD. After EqD is notified and set to the register of ONU 20-1, ONU 20-1 enters an operation state S214. In response to an event of completion of a second set-up process (S213), OLT 10 enters the operation state for ONU 20-1 (S215).

The details of the first set-up process (S212) are illustrated at Steps S2121 to S2125, and S2200 and S2300 in FIG. 6 and the second set-up process (S213) are illustrated at Steps S2131 to S2133, and S2200 and S2300.

Upon reception of a set-up signal S210 from OLT 10, RE 10000 terminates this message and sends an SN request signal S2121 newly issued by RE10000. In response to this, ONU 20-1 sends an SN notice signal S2122 including an SN set to its apparatus to RE 10000. After SN is received, an SN confirmation process S2131 is executed in the section 100 between RE 10000 and OLT 10.

If it is confirmed that SN received from ONU 20-1 is correct, OLT 10 issues ONU-ID as an identifier to be assigned to ONU 20-1. This ONU-ID is inserted into a down communication message and notified to RE 10000 (S2132). RE 10000 transfer the message to ONU 20-1 (S2123). ONU-ID is stored in DB 11061 of the ONU management unit 11060 of RE 10000 (S2200) to be used in the operation to follow. ONU-ID is stored because correspondence is provided between ONU-ID and EqD information and it is necessary to set a frame having ONU-ID as a parameter in order to use an already existing PLOAM frame.

As the second ONU management unit 210 of RE 10000 confirms the correspondence between new ONU 20-1 and ONU-ID, RTD between ONU 20-1 and RE 10000 is measured by the ranging process (S2124). In this process, the ranging control unit 11050 of RE 10000 operates in a manner similar to ranging of OLT 10 stipulated by ITU-T Recommendations G984.3. RE 10000 determines EqD be assigned to ONU 20 from the RTD measurement results, stores the EqD value in the EqD information DB 12510 of the ranging control unit 11050 (S2300), and notifies the value to ONU-20-1 (S2125). ONU 20-1 stores the EqD value in the EqD information DB 2071 to be used in the operation to follow such as a signal transmission/reception. After EqD is stored in DB 11051, RE 10000 transmits a ranging completion notice indicating completion of the ranging process for ONU 20-1 to OLT 10 (S2133).

As a notice regarding connection management of ONU 20 is received in the ranging completion notice S2133 from RE 10000, the PON control unit 1000 of OLT 10 checks the contents of the message, and if the message is a connection completion notice for ONU 20-1, management information of ONU 20-1 registered in the ONU management DB 1061 of the first ONU management unit 200 to thereafter enter the operation start state of ONU 20. The ranging completion notice S2133 may also use the VSM message of the PLOAM message. After the above-described sequence, ONU 20-1 enters the operation start state S214, and OLT 10 also enters the operation start state S215. In this manner, state transition of OLT 10 and ONU 20 at opposite ends of the PON section 80 is performed synchronously.

After ONU 20-1 enters the operation start state, ONU 20-1 sends a transmission bandwidth request S216 of an up signal to RE 10000. RE 10000 determines up signal communication bandwidth assignment of each ONU 20 by DBA (S218). Calculated bandwidth assignment information is inserted into a Bandwidth Map (BWmap) field (not shown), and sent to ONU 20 (S220). ONU 20-1 received the bandwidth assignment information transmits an up signal S221 in accordance with the designated timing and transmission amount. This signal is terminated once by RE 10000, and converted into a continuous optical signal in the manner described previously (S223). The continuous optical signal reaches OLT 10 as an up signal S222.

The above-described series of processes including an up bandwidth request from ONU 20 (S216), DBA process S218 by RE 10000 and up signal bandwidth notice (S220) are repeated periodically. In the DBA process in each period, RE 10000 compares an optical signal received from ONU 20 with each value stored in the EqD information DB 11051 to confirm a reception timing of each up signal (up frame). After bandwidth assignment, i.e., after data transmission permission, ONU 20 sends an up signal in accordance with the transmission instruction (S221). If there is a reception timing shift at RE 10000, the EqD value is corrected or ranging is performed again as described previously.

As illustrated in the above-described sequence, in PON of the present invention, OLT 10 manages parameters such as SN and ONU-ID for managing the connection state of ONUs 20-1 to 20-n, and RE 10000 is in charge of the set-up process for ONU 20 and the DBA process after the operation start. Similar to already existing techniques, while OLT 10 maintains the concentrated management function for ONUs 20, the section subjected to DBA is not between OLT and ONU but between RE and ONU even if the PON section 80 is extended. The operation is therefore possible by reducing (not increasing) a capacity of a data buffer implemented in ONU 20.

In PON 40 of the present invention, set-up sequences other than the above-described set-up sequence for ONU 20 may be adopted. For example, as described previously, an SN request message stipulated by ITU-T Recommendations G984.3 may be used as the set-up start notice 5210 from ONU 10. In this case, RE 10000 operates simply to transfer (transmit) a signal of the received set-up start process notice (S210) to ONU 20 (S2121). In this case, definitions of the VSM message are reduced by one as compared to the above-described sequence, and in addition, the time required for OLT 10 to generate/transmit the set-up start notice S210 and required for the reception process of the notice can be shortened further.

Figure 7:
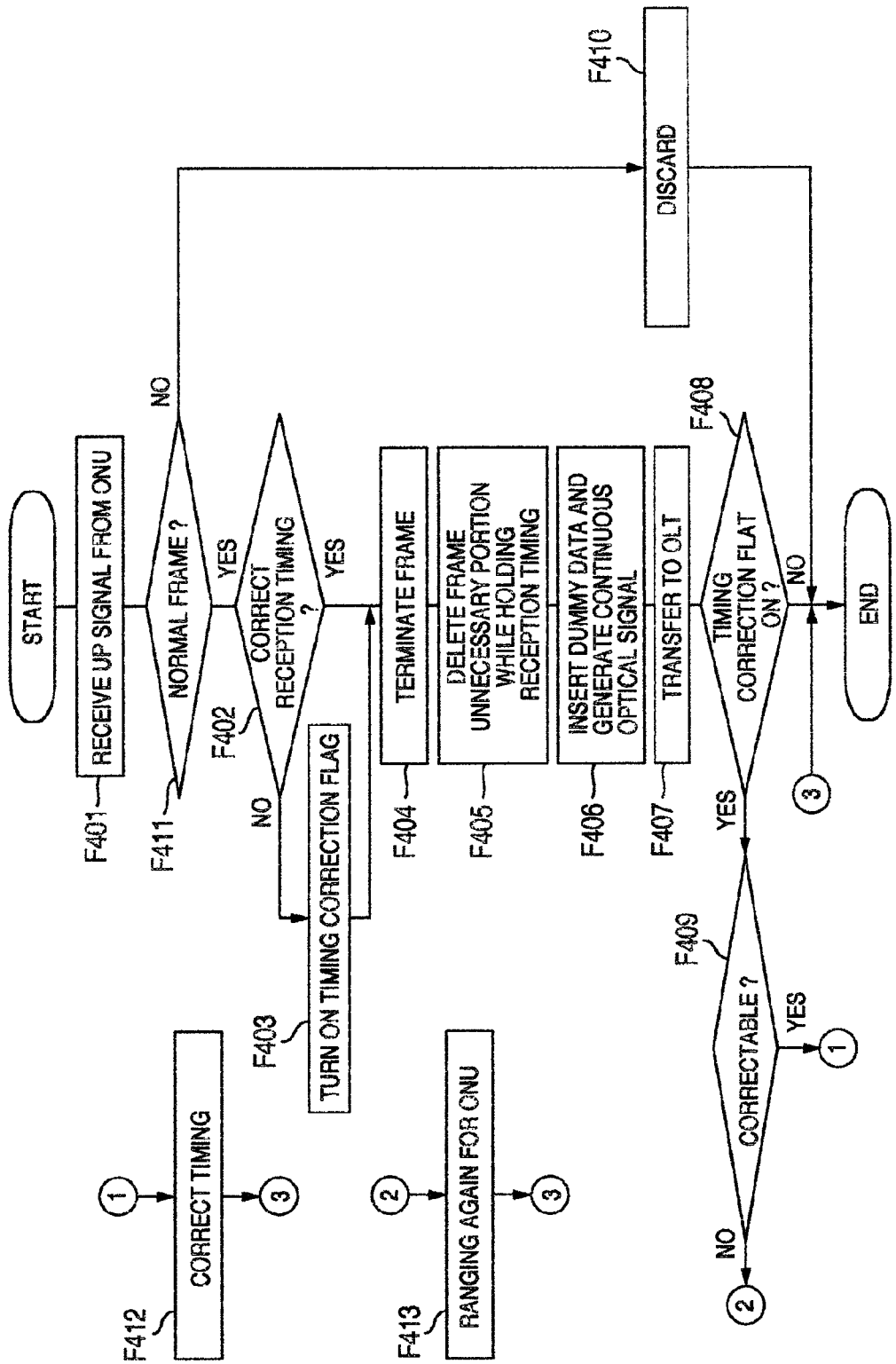
FIG. 7 is a flow chart illustrating an example of the operation of RE of the present invention.

FIG. 7 is a flow chart illustrating an example of the operation of RE of the present invention processing an up signal transmitted from ONU.

As the O/E conversion unit 12210 receives an up frame (F401), the O/E conversion unit confirms validity of the received up frame (F411). If any abnormality is found in the frame and this abnormality is unable to be corrected, this frame is discarded (F410). If the frame is normal, a reception timing of the frame is confirmed (F402). More specifically, the DBA information DB 11071 is referred to and it is confirmed whether a signal from ONU 20 is received correctly in accordance with the timing and data amount designated by RE 10000. At this stage, if a reception timing of the up frame is different from an estimated value, it is necessary to set again a data sending timing of ONU in order to adjust the up frame reception time at RE 10000. To this end, at Step F403 a timing correcting flag of each ONU held in RE 10000 is once turned ON.

The operation of the reception frame processor unit is performed next. First, burst data received at the O/E conversion unit 12210 is terminated to extract a reception frame signal (F404). The frame signal is once accumulated in a frame reception buffer (not shown) provided in the up frame processor unit 12220 of RE 10000. The up frame processor unit 12220 removes data unnecessary for continuous optical format conversion, such as a preamble and delimiter added to the frame signal, by using the frame reception timing notified by the O/E conversion unit 122210 or RE control unit 11000 (F405). Next, a dummy signal is inserted into the area whose data was removed at Step F405 (F406). With this process, burst data from each ONU is able to be converted into a continuous signal. As described previously, the dummy signal may be a dummy frame constituted of a header and a payload. Since a signal read from the buffer of the up frame processor unit 12220 was converted into continuous data, the E/O conversion unit 12230 transfers to OLT 10 an optical continuous signal having an optical intensity capable of being received by OLT 10 (F407).

After the frame is transferred to OLT at Step F407, the reception timing of the up frame is confirmed again. If the up frame reception timing confirmed at Step F403 has an error of a constant value (threshold value) or larger from the time designated by DBA of RE 10000, i.e., if the timing correction flag is ON, ONU is instructed to correct the timing (F412). More specifically, in G-PON, the EqD set value is instructed to be corrected. If an error is too larger, the ranging process stipulated by ITU-T Recommendation G948.3 is executed again to check the settings (F413).

FIG. 8 is a diagram illustrating an example of the structure of a memory constituting a database of RE for managing up bandwidth request information of ONUs.

A bandwidth request information DB 11072 collects periodically up communication bandwidth requests from ONUs 20 and stores the requests. In accordance with this information, the DBA control unit 11070 of RE 10000 determines bandwidth assignment of each ONU 20. More specifically, in this configuration, Alloc-ID same as for DBA management is used as the unit of bandwidth management, and DB is constituted of Alloc-ID 4001, a bandwidth request amount 4002 and a flag 4003. It is possible to set a plurality of Alloc-Ids 4001 to each ONU 20, and bandwidth calculation and assignment are performed in the unit of Alloc-ID. In calculating the bandwidth request amount 4002 in the unit of Alloc-ID 4001, a reception timing (time) of an up frame transmitted from ONU 20 is compared with DBA information to judge Alloc-ID 4001. If the reception timing shills greatly from the estimated value. Port-ID or ONU-ID is extracted from header information of a GEM frame received as an up signal or from PLOu of an up frame header, and an ONU management table to be described later is searched to acquire a correspondence with Alloc-ID 4001.

FIG. 9 is a diagram illustrating an example of the structure of a memory constituting a database of RE for managing DBA information.

In the DBA processing by RE 10000, up transmission permission is given in the unit of Alloc-ID 5001 as described in ITU-T Recommendations G984.3. More specifically, a relative transmission start time S_Start 5002 measured from the reference time stipulated by EqD and a transmission data amount 5003 are designated for each Alloc-ID 5001 and stored in DB. Instead of designating the transmission data amount 5003, the configuration using the transmission start time S_Start 5002 and a transmission end time S_Stop may be used.

Figure 10:
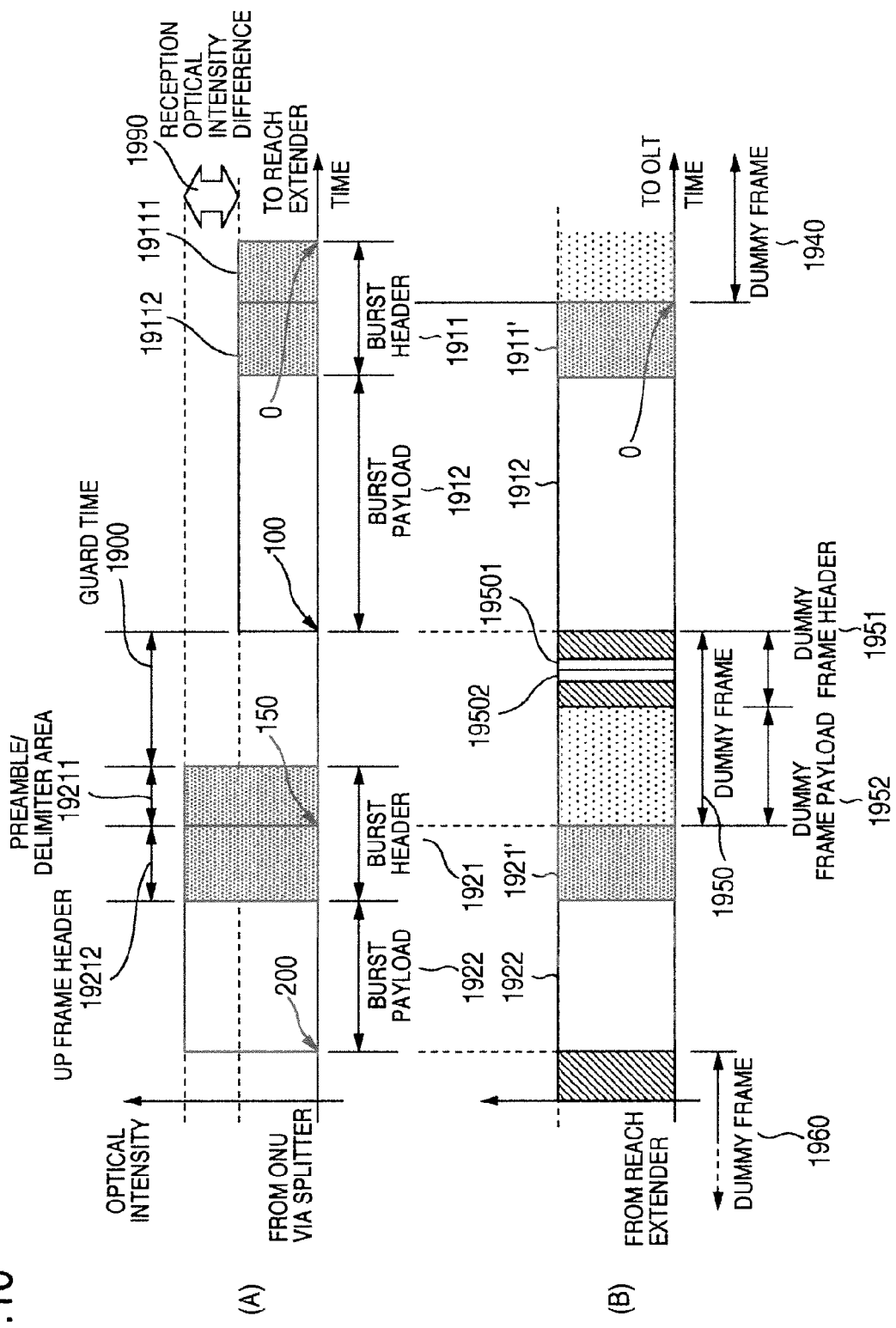
FIG. 10 is a diagram illustrating an example of the structure of an up signal of the PON system of the present invention.

FIG. 10 is a diagram illustrating an example of the structure of up signals of the PON system incorporating RE, up signals from ONUs 20 to OLT 10 being multiplexed.

A GEM frame transmitted from each of ONUs 20-1 to 20-n via each of branch line optical fibers 110-1 to 110-n passes through the splitter and is subjected to optical time division multiplexing on one line concentrator optical fiber 70-2 as illustrated in (A) of FIG. 10. A burst signal constituted of a burst header 1911 and a burst payload 1912 is a GEM frame transmitted from ONU 20-1, and a burst signal constituted of a burst header 1921 and a burst payload 1922 is a GEM frame transmitted from ONU 20-2. (A) of FIG. 10 illustrates that there is an optical intensity difference between optical signals received at RE 10000 from each ONU 20 because of attenuation of an optical signal caused by a distance between RE 10000 and each ONU 20. In this configuration, in order to allow RE 10000 to execute signal synchronization and frame termination, a signal is transmitted from each ONU 20 in the state that a transmission interval (guard time) 1900 is retained, and RE 10000 receives each GEM frame as a burst signal. In GPON, it is determined that the guard time is 32 bits or longer. (A) of FIG. 10 illustrates that the GEM frame constituted of the burst header 1911 and burst payload 1912 has a reception optical intensity lower than that of the GEM frame constituted of the burst header 1921 and burst payload 1922, and that there is a reception intensity difference 1990. Each GEM frame generated for each ONU or Alloc-ID is transmitted from each ONU 20 to RE 10000.

(B) of FIG. 10 illustrates an example of the structure (signal intensity and timing) of an up signal to be transmitted to OLT after a GEM frame (burst signal) from each ONU is converted into a continuous signal at Steps F404 to F407 in FIG. 7.

Although the detailed structure will be described later, an up frame to be transmitted to OLT 10 is prepared by deleting a preamble/delimiter area 19111 from the burst header 1911 and leaving an up frame header 19112, to be constituted of a frame header 1911' and burst payload 1912, and similarly an up frame to be transmitted to OLT 10 is prepared by deleting a preamble/delimiter area 19211 from the burst header 1921 and leaving an up frame header 19212, to be constituted of a frame header 1921' and burst payload 1922, (FIG. 7: F405). In order to form a continuous signal, in this configuration, a dummy signal is further inserted between frames (FIG. 7: F406). More specifically, in the structure, dummy frames 1940, 1950 and 1960 are inserted between frames transmitted from ONUs. Although the detailed structure will be described later, the dummy frame 1950 is constituted of a dummy frame header 1951 and a dummy frame payload 1952. A frame length field 19502 representative of a dummy frame length is inserted into the header 1951 at positions similar to those of the signal headers 1911 and 1921, in conformity with ITU-T Recommendations. A flag 19501 indicating a dummy frame is also inserted. OLT 10 for receiving a continuous signal can distinguish the start point of the signal 1921 following the dummy frame 1950.

The guard time between GEM frames and the preamble/delimiter area of the GEM frame deleted by RE 10000 of the present invention are used for gap distinction and frame synchronization, essential for OLT 10, of a GEM frame (burst frame) transmitted from each ONU. In order to execute gap distinction and frame synchronization, particularly in order to execute frame synchronization in a short time (the small number of bits), a high performance phase lock loop (PLL) circuit and a high performance optical device are used, and a precise operation adjustment is required. According to the present invention, RE 10000 deletes these signals and converts them into a continuous signal to be transferred to OLT 10. The PLL circuit and high performance optical device are not necessary so that the implementation cost of OLT 10 can be reduced greatly.

Further, RE 10000 terminates once an optical signal from each ONU 20 and converts the optical signals into a continuous signal to be transferred to OLT so that an optical intensity can be made constant. OLT 10 is therefore not required to adjust a reception optical intensity in accordance with an optical intensity of a signal from ONU. It is not required to use the PLL circuit, a high performance optical device such as ATC and its control circuit so that the implementation cost of OLT 10 can be reduced greatly. These advantageous effects are particularly effective if OLT 10 having an optical access network configuration to be described accommodates a number of ONUs. Since an optical signal is once terminated at the intermediate point in the PON section, the advantageous effects in terms of performance are expected. These effects become remarkable in the case wherein a distance between RE 10000 and ONU is shorter than a distance between OLT 10 and RE 10000. A variation in a reception optical signal intensity to be caused by a communication distance difference between ONUs can be suppressed, and a difference of transmission/reception performance between optical modules can be prevented from being actualized. The cost of optical signal reception circuits of RE 10000 and OLT 10 can therefore be reduced.

Figure 11:
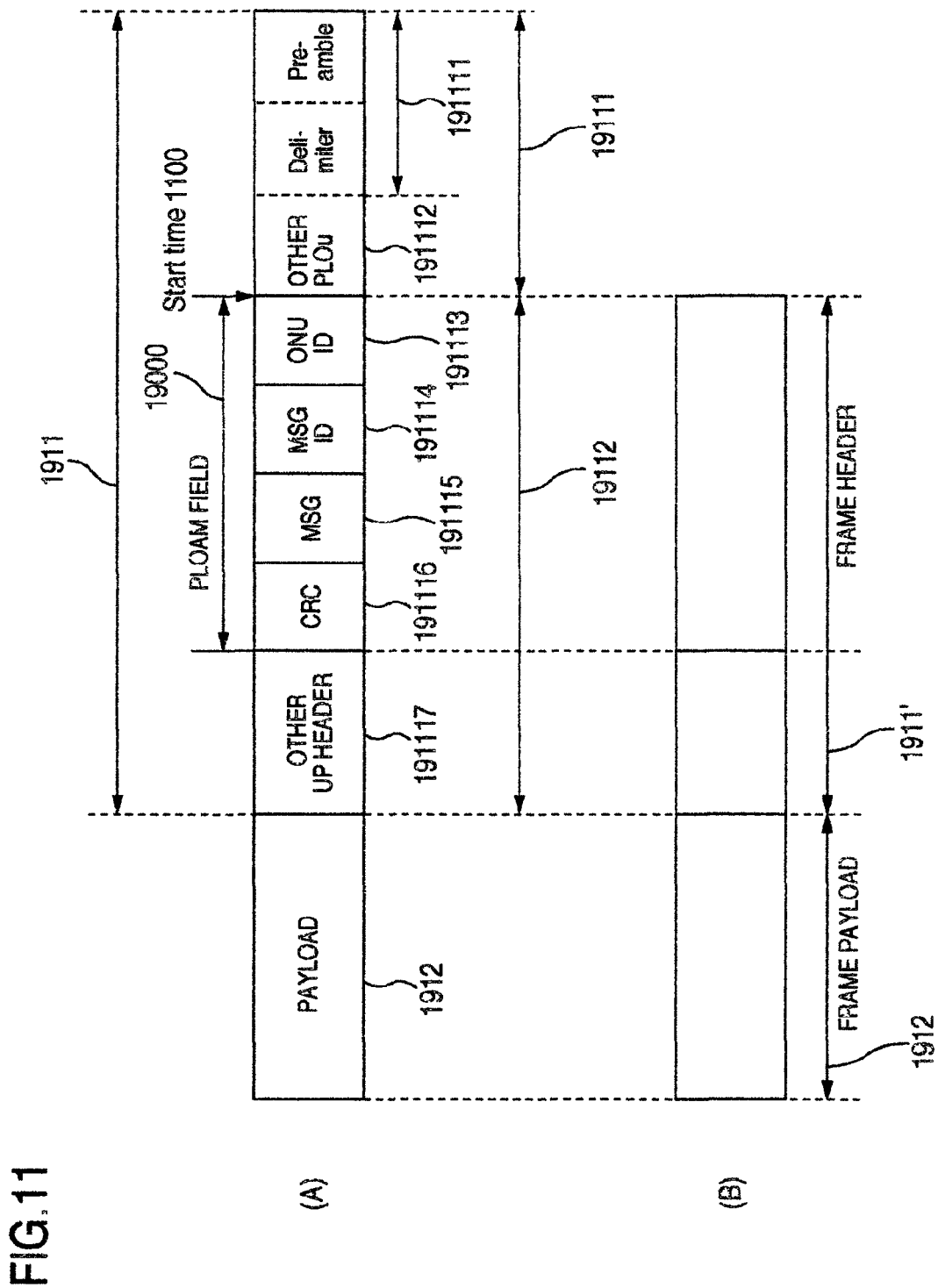
FIG. 11 is a diagram illustrating also the details of an example of the structure of the up signal.

FIG. 11 is a diagram illustrating the details of an example of the structure of up signals whose header information is converted.

(A) of FIG. 11 illustrates the structure of a GEM frame to be received at RE 10000 from each ONU and the detailed structure of a burst header 1911. The state of data before frame format conversion is illustrated to clarify a format correction process. A GEM frame has an area 191111 constituted of a preamble and a delimiter in front of an up frame header 19112. In GPON, this area 191111 is a portion of PLOu preamble/delimiter area) 19111, and the preamble/delimiter area 19111 also contains information (several bits) 191112 including ONU-ID. A PLOAM field 19000 is input to an up frame header 19112 next to the preamble/delimiter area 19111. A transmission start position instructed to each ONU 20 in the DBA process is presented by a start position 1100 of the PLOAM field. The PLOAM field 19000 contains an ONU-ID 191113, a message ID 191114, a PLOAM message body 191115 and a CRC 191116 for error detection of the PLOAM field, respectively stipulated in Recommendations. The up frame header 19112 also contains another up header 191117 including a field for inserting therein an up bandwidth request, and then a payload area 1912 for storing the GEM frame exists.

(B) of FIG. 11 illustrates the structure of a frame converted by RE 10000 to be transmitted to OLT 10. When a continuous optical signal is generated, the preamble/delimiter area 19111 is deleted from the burst header 1911 illustrated in (A) of FIG. 11. The information 191112 including ONU-ID in PLOu is used for confirming whether each ONU 20 is transmitted at a correct timing, becomes unnecessary after RE 10000 receives the GEM packet, and may be deleted at this time. The PLOAM field 19000 and other up header 191117 contain information for controlling each ONU 20 and are required to be transmitted to OLT 10 having a function of controlling each ONU 20. As described above, a GEM frame received from each ONU 20 is converted into a frame containing information from the start position of the up burst frame, i.e., the PLOAM field 19000, to the end position of the other header 191117 and to a frame payload 1912 same as the received payload 1912.

Figure 12:
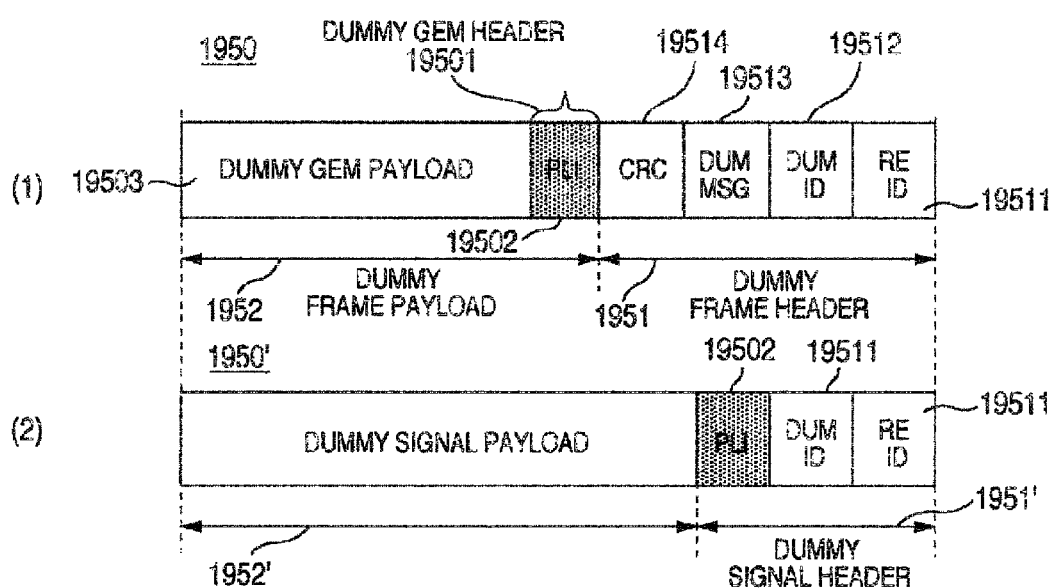
FIG. 12 is a diagram also illustrating an example of the structures of a dummy frame and a dummy signal.

FIG. 12 is a diagram illustrating an example the structure of a dummy frame or dummy signal to be used when a burst signal sent from ONU is converted into a continuous signal.

In order to transmit a continuous signal to OLT 10, RE 10000 deletes header information added to a GEM packet transmitted from ONU, and generates a continuous signal by inserting a dummy frame or dummy signal in the deleted area and guard time (1900 in FIG. 10).

Since OLT 10 processes also a dummy frame, the dummy frame has the same fundamental structure as that of a GEM frame stipulated by Recommendations. Since the dummy frame has less effective information, the size of a payload can be reduced and the structure of a header can be simplified. In the configuration of the PON system of the present invention, a dummy frame 1950 (in FIG. 10, three dummy frames 1940, 1950 and 1960 are used) having the structure as illustrated in (1) of FIG. 12 is defined, RE 10000 inserts the dummy frame between frames transmitted from ONUs to generate a continuous signal to be transmitted to OLT 10. OLT 10 receives the continuous optical signal illustrated in FIG. 10 and processes frames from ONUs. To this end, OLT 10 has a PLOAM processing function and a PLOAM terminating function. The dummy frame has therefore a header area and a dummy payload merely filling (stuffing) an empty area, in correspondence with the PLOAM.

More specifically, as the header information corresponding to the PLOAM field 19000 ((A) of FIG. 11) stipulated by Recommendations, a dummy frame header 1951 is constituted of an identifier RE ID 19511 of RE 10000 for use by OLT 10, a dummy signal identifier DUMMY ID 19512 indicating a dummy signal, a dummy signal 19513 for stuffing the message field MSG (191115 in FIG. 11) of the PLOAM field 19000, and a CRC 19514 for checking a header error of the dummy frame. A dummy GEM frame is inserted into the dummy frame 1950. The dummy GEM frame has an area 19502 indicating a data length called a Payload Length Indicator (PLI). Data for stuffing an empty area between ONU frames is inserted into a dummy GEM payload 19503. OLT 10 refers to PLI 19501 to know a length of the dummy frame, i.e., a wait time (the number of bits/bytes) for a dummy frame from the next ONU. OLT 10 is required to have a function of when a continuous optical signal is received, judging whether the signal is a normal data frame or a dummy frame, and if it is judged as the dummy frame, stopping signal fetching. In the configuration (details are not illustrated), this judgment is realized by making the O/E conversion unit 1320 and up frame processor unit 1410 described previously detect RE ID 19511 or DUMMY ID 19512 of the dummy frame header.

(2) of FIG. 12 illustrates an example of the structure of a more simplified dummy signal. A dummy signal header 1591 is prepared at the position to which OLT 10 refers when the first dummy signal is received. The dummy signal header 1591 is constituted of an RE ID 19511 for RE 10000, a DUMMY 19512 and a PLI field 19502 indicating a continuation time (payload length) of a dummy signal. Data for stuffing an empty area between ONU frames corresponding to the length indicated by PLI is inserted into a dummy signal payload 1950' following the header. With this configuration, OLT 10 cannot judge whether the header corresponds to the PLOAM field. However, if it is stipulated that an empty area between ONUs be buried with a dummy signal, an up frame and a dummy signal are alternately received so that judgment is possible. More precisely, an end position payload data from each ONU can be judged by OLT by referring to PLI of a GEM frame. If frame synchronization of a normal frame from ONU is not possible by using HEC (not shown) provided in the GEM frame, it is possible to judge that the signal is a dummy signal from the start of the frame. In this case, the start of the frame is again checked so that the dummy signal continuation time can be confirmed.

Either RE ID 19511 or DUMMY ID 19512 may be used.

RE 10000 provided in the PON system of the present invention deletes header information of a GEM frame from each ONU, and a dummy frame or a dummy signal is transmitted to the unnecessary bandwidth. The number of accommodated ONUs of PON can therefore be increased. This configuration will be described in detail with reference to the accompanying drawings.

Figure 13:
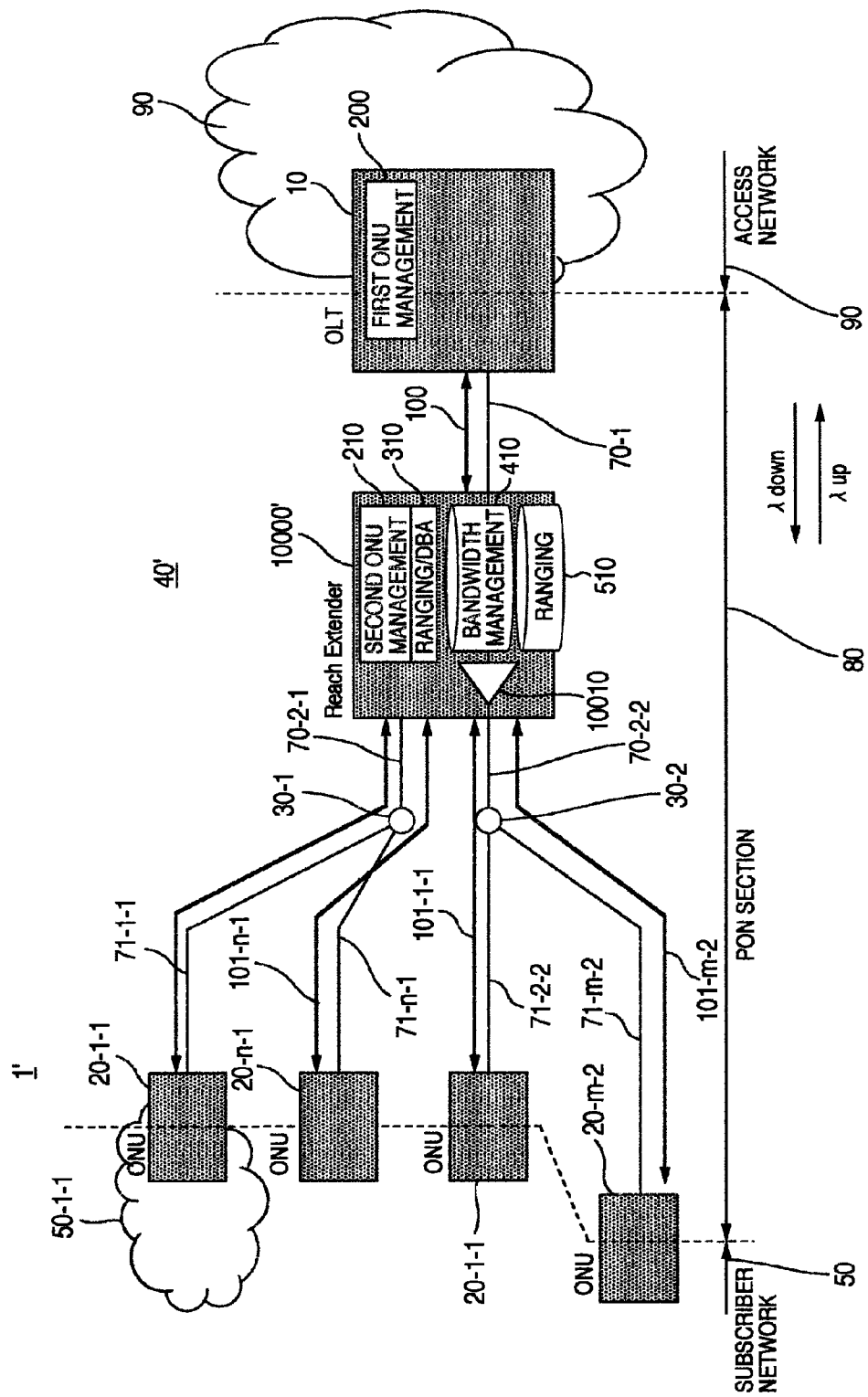
FIG. 13 is a diagram illustrating another example of configuration of an optical access network using PON of the present invention.

FIG. 13 is a diagrams illustrating another example of the configuration of an access network of the PON system with RE of the present invention.

Apparatus and optical fibers constituting an optical access network 1' and its configuration are similar to those illustrated in FIG. 1. The optical access network 1' has a plurality of line concentrator optical fibers 70-2-1 and 70-2-2 at RE 10000' each 70-2 being connected to each of splitters 30-1 and 30-2. In this configuration, a plurality of ONUs are connected to ONU groups of a plurality of series (two series in FIG. 14). In the following, an ONU group under the splitter 30-1 is called "first splitter group", and an ONU group under the splitter 30-2 is called "second splitter group".

RE 10000 executes the ranging/DB process for the first and second ONU groups. The optical fibers 70-2-1 and 70-2-2 physically connected to RE 10000 are different, and the number of objects subjected to the ranging/DBA process is increased resulting in an increase in the number of frequencies executing the process. RE 10000' and OLT 10 have the same shared burden as that of the network configuration described previously. For ONU belonging to either the first or second ONU group, ONU management parameters including ONU-ID, SN, and Port-ID are held in the ONU management unit 1 of OLT 10. Similarly, RE 10000 holds (a portion of) parameters managed by OLT 10 in the database of the ONU management unit 2, to have a correspondence with a bandwidth control parameter Alloc-ID.

Figure 14:
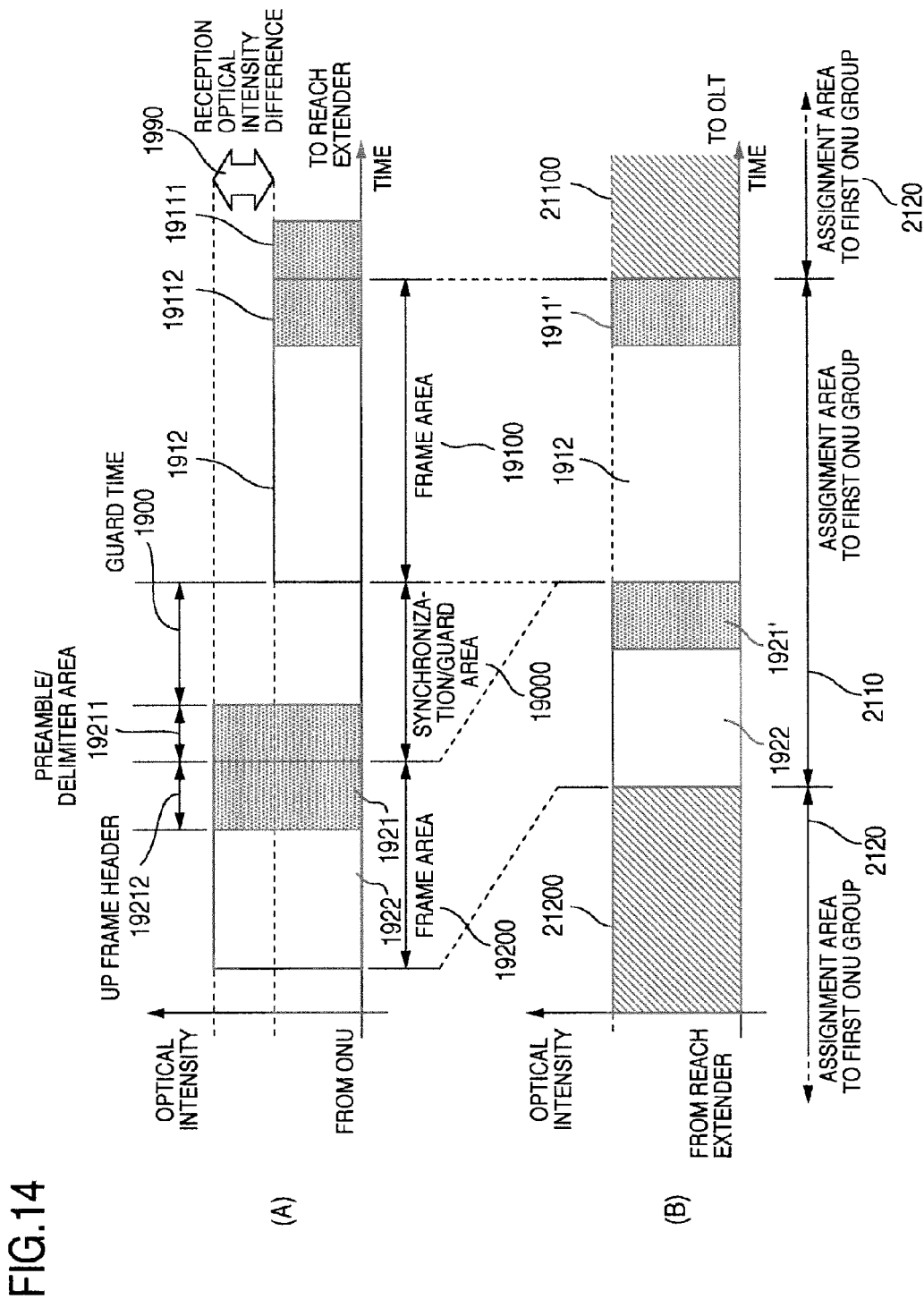
FIG. 14 is a diagram illustrating another example of the up signal of the PON system.

FIG. 14 is a diagram illustrating an example of the structure of an up signal of a PON system 40' of the optical access network, and indicating that an up signal from each ONU 20 to OLT 10 is multiplexed by a configuration different from that described previously.

(A) of FIG. 14 illustrates an example of the structure of burst signals received at RE 10000, illustrating a reception state of GEM frames from ONUs of the first ONU group connected to a plurality of optical fibers 70-2-1 under RE 10000, the reception state being similar to that illustrated in (A) of FIG. 10.

(B) of FIG. 14 is a diagram illustrating an example of the structure of an up signal to be sent to OLT 10 by making RE 10000 convert GEM frames received from ONUs belonging to each ONU group into a continuous signal. Similar to the operation of the network configuration described previously, a synchronization/guard area 19000 is deleted, being constituted of a guard time area 1900 and a preamble/delimiter area 19211 provided for receiving an up burst signal from ONU 20. In PON 40' of this network configuration, however, RE 10000 does not insert a dummy frame in an empty area, but a frame area 19200 excepting a synchronization/guard area 19000 is transmitted for each ONU group to follow a frame area 19100 received from another ONU 20. Since the bandwidth to be assigned to the first ONU group can be made narrow, a transmission bandwidth (data transmission time) from RE 10000' to OLT 10 has empty bandwidths 21100 and 21200 as illustrated. In order to positively use these empty bandwidths, the empty bandwidths are assigned by DBA to other ONUs of the second ONU group, and similarly, the synchronization/guard area 19000 is deleted also from each GEM packet received from each ONU. Namely, the synchronization/guard area 19000 provided between GEM packets from ONUs and required in an already existing PON is deleted also from the second ONU group to couple the frame area of the second GNU group. This coupled signal is inserted between the empty bandwidths 21100 and 21200 to form a continuous signal coupling both the first and second ONU groups and to send the continuous signal to OLT 10. An operation of transmitting an optical signal from RE 10000' to OLT 10 after the continuous signal is generated and receiving the continuous signal at OLT 10 is the same as the operation of the system having the network configuration described previously.

In the above-described configuration and operation, a plurality of ONUs are divided into a plurality of ONU groups, and DBA is performed for each ONU group to realize time division multiplexing of signals from each ONU group by using a plurality of line concentrator optical fibers. Paying attention to that signals from different ONU groups will not collide with each other on line concentrator optical fibers 70-2, frame signals in the same ONU group are made continuous without inserting a dummy frame to thereby form an empty bandwidth. DBA is performed by paying attention to this empty bandwidth. It is therefore possible to effectively use the bandwidth more than a conventional PON system, including an increase in a bandwidth assigned to ONU and an increase in the number of accommodated ONUs.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical communication system connecting a parent station and a plurality of child stations via an optical fiber network equipped with an optical splitter comprising a relay for relaying a signal for transmission/reception between the parent station and the plurality of child stations in said optical fiber network, said relay having a control unit including: a measuring unit for measuring a transmission distance or time to each child station;

a determining unit for determining a timing when the child station transmits a signal, in response to a transmission bandwidth request indicating a data amount waiting for transmission from the child station; and a signal processing unit for processing a signal received from the child station and transmitting the processed signal to the parent station, wherein:

said relay notifies each child station of the timing determined by said determining unit after measurement by said measuring unit;

upon reception of a burst signal constituted of a header and a payload from the child station at the notified timing, said signal processing unit deletes a portion of the header of the received burst signal in accordance with the timing, and converts the received burst signals into a series of signals by inserting a dummy signal into the deleted area and a gap area between received burst signals to be transmitted to the parent station; and the parent station receives the series of signals converted by said relay from signals transmitted from the plurality of child stations.

2. An optical communication system connecting a parent station and a plurality of child stations via an optical fiber network equipped with an optical splitter comprising a relay for relaying a signal for transmission/reception between the parent station and the plurality of child stations in said optical fiber network, said relay having a control unit including: a measuring unit for measuring a transmission distance or time to each child station;

a determining unit for determining a timing for each of a plurality of groups dividing the plurality of child stations when the child station transmits a signal, in response to a transmission bandwidth request indicating a data amount waiting for transmission from the child station, and a signal processing unit for processing a signal received from the child station and transmitting the processed signal to the parent station, wherein:

said relay notifies each child station of the timing determined by said determining unit after measurement by said measuring unit;

upon reception of a burst signal constituted of a header and a payload from the child station at the notified timing, said signal processing unit deletes a portion of the header of the received burst signal in accordance with the timing, and converts the received burst signals into a series of signals by inserting a signal received from an arbitrary child station of each group after changing a timing into the deleted area and a gap area between received burst signals to be transmitted to the parent station; and the parent station receives the series of signals converted by said relay from signals transmitted from the plurality of child stations.

3. The optical communication system according to claim 1, wherein in said optical fiber network, said relay is inserted into a first optical fiber between the parent station and said optical splitter.

4. The optical communication system according to claim 1, wherein the series of signals transmitted from said relay to the parent station is a continuous optical signal having a constant intensity set between said relay and the parent station.

5. The optical communication system according to claim 1, wherein the determining unit is configured to determine the timing in accordance with a guard time as the gap area for preventing the burst signals output from the plurality of child stations from being interfered in said optical fiber network, and in accordance with a preamble and a delimiter contained in the header of each burst signal, and said signal processing unit deletes at least the preamble and the delimiter and inserts a burst signal received from an arbitrary child station and subjected to a change in a timing into the deleted area and the gap area.

6. The optical communication system according to claim 2, wherein the determining unit is configured to determine the timing in accordance with a guard time as the gap area for preventing the burst signals output from the plurality of child stations from being interfered in said optical fiber network, and in accordance with a preamble and a delimiter contained in the header of each burst signal, and said signal processing unit deletes at least the preamble and the delimiter and inserts a burst signal received from an arbitrary child station and subjected to a change in a timing into the deleted area and the gap area.

7. An operation method for an optical communication system connecting a parent station and a plurality of child stations via an optical fiber network equipped with an optical splitter includes a relay for relaying a signal for transmission/reception between the parent station and the plurality of child stations in said optical fiber network, wherein:

when said optical communication starts operating, said relay measures a transmission distance or time between said relay and the plurality of child stations;

in operation of said optical communication system, said relay determines a timing when each of the plurality of child stations transmits a signal, in response to a measurement result and a transmission bandwidth request indicating a data amount waiting for transmission from the plurality of child stations, and makes each of the plurality of child stations transmit a burst signal constituted of a header and a payload at the timing;

said relay deletes a portion of the header of the burst signal received at the timing and converts the received burst signals into a series of signals by inserting a dummy signal into the deleted area and a gap area between received burst signals to be transmitted to the parent station; and the parent station receives the series of signals converted into signals transmitted from the plurality of child stations by said relay.

8. An operation method for an optical communication system connecting a parent station and a plurality of child stations via an optical fiber network equipped with an optical splitter includes a relay for relaying a signal for transmission/reception between the parent station and the plurality of child stations in said optical fiber network, wherein:

when said optical communication starts operating, said relay measures a transmission distance or time between said relay and the plurality of child stations;

in operation of said optical communication system, said relay determines a timing for each of a plurality of groups dividing the plurality of child stations when each of the plurality of child stations transmits a signal, in response to a measurement result and a transmission bandwidth request indicating a data amount waiting for transmission from the plurality of child stations, and makes each of the plurality of child stations transmit a burst signal constituted of a header and a payload at the timing;

said relay deletes a portion of the header of the burst signal received at the timing and converts the received burst signals into a series of signals by inserting a signal received from an arbitrary child station of each group and subjected to a change in a timing into the deleted area and a gap area between received burst signals to be transmitted to the parent station; and the parent station receives the series of signals converted into signals transmitted from the plurality of child stations by said relay.

9. The operation method for an optical communication system according to claim 7, wherein the series of signals transmitted from said relay to the parent station is a continuous optical signal having a constant intensity set between said relay and the parent station.

* * * * *